(12) United States Patent
Work et al.

(10) Patent No.: US 10,697,034 B2
(45) Date of Patent: Jun. 30, 2020

(54) SYSTEM AND METHOD FOR PRODUCING A HARDENED AND TEMPERED STRUCTURAL MEMBER

(71) Applicant: Roll Forming Corporation, Shelbyville, KY (US)

(72) Inventors: Matthew Work, Louisville, KY (US); William Schooley, Shelbyville, KY (US)

(73) Assignee: Roll Forming Corporation, Shelbyville, KY (US)

( * ) Notice: Subject to any disclaimer, the term of this patent is extended or adjusted under 35 U.S.C. 154(b) by 212 days.

(21) Appl. No.: 15/804,658

(22) Filed: Nov. 6, 2017

(65) Prior Publication Data
US 2018/0057902 A1    Mar. 1, 2018

Related U.S. Application Data

(62) Division of application No. 14/337,921, filed on Jul. 22, 2014, now Pat. No. 9,850,553.

(51) Int. Cl.
| | |
|---|---|
| *C21D 8/00* | (2006.01) |
| *C22C 38/38* | (2006.01) |
| *C22C 38/32* | (2006.01) |
| *C22C 38/28* | (2006.01) |
| *C22C 38/22* | (2006.01) |

(Continued)

(52) U.S. Cl.
CPC ............. *C21D 8/005* (2013.01); *C22C 38/00* (2013.01); *C22C 38/001* (2013.01); *C22C 38/02* (2013.01); *C22C 38/04* (2013.01); *C22C 38/06* (2013.01); *C22C 38/22* (2013.01); *C22C 38/28* (2013.01); *C22C 38/32* (2013.01); *C22C 38/38* (2013.01); *C21D 2261/00* (2013.01)

(58) Field of Classification Search
CPC .... C21D 2261/00; C21D 8/005; C22C 38/00; C22C 38/001; C22C 38/02; C22C 38/04; C22C 38/06; C22C 38/22; C22C 38/28; C22C 38/32; C22C 38/38
See application file for complete search history.

(56) References Cited

U.S. PATENT DOCUMENTS

| | | |
|---|---|---|
| 2,549,930 A | 4/1951 | Riegel |
| 4,142,923 A | 3/1979 | Satava |

(Continued)

FOREIGN PATENT DOCUMENTS

| | | |
|---|---|---|
| CA | 2332933 | 11/2007 |
| CN | 101942553 A | 1/2011 |

(Continued)

OTHER PUBLICATIONS

Semaitin, S.L. et al, "Induction Heat Treatment of Steel"; American Society of Metals, 1986, pp. 209 and 214.

(Continued)

*Primary Examiner* — Jenny R Wu
(74) *Attorney, Agent, or Firm* — Middleton Reutlinger

(57) ABSTRACT

System and methods relating to in-line heat-treating, hardening and tempering of material, such as for example, coiled steel into a roll-formed, hardened and tempered structural member having uniform or different targeted properties in selected zones of the structural member. The different targeted properties may be achieved by heating and/or cooling the material subject to certain parameters.

12 Claims, 10 Drawing Sheets

(51) Int. Cl.
*C22C 38/06* (2006.01)
*C22C 38/00* (2006.01)
*C22C 38/04* (2006.01)
*C22C 38/02* (2006.01)

(56) References Cited

U.S. PATENT DOCUMENTS

| | | | |
|---|---|---|---|
| 4,394,194 | A | 7/1983 | Satava et al. |
| 4,404,047 | A | 9/1983 | Wilks |
| 5,235,838 | A * | 8/1993 | Berstein ............... B21D 3/02 |
| | | | 148/510 |
| 5,545,269 | A | 8/1996 | Koo et al. |
| 5,669,992 | A | 9/1997 | Bronsema et al. |
| 5,885,522 | A | 3/1999 | Giannini et al. |
| 5,968,293 | A | 10/1999 | Giannini et al. |
| 5,972,134 | A | 10/1999 | Buschsieweke et al. |
| 6,185,978 | B1 | 2/2001 | Sundgren et al. |
| 6,374,901 | B1 | 4/2002 | Frank et al. |
| 6,557,622 | B2 | 5/2003 | Frank et al. |
| 7,691,213 | B2 | 4/2010 | Takayama et al. |
| 8,021,497 | B2 | 9/2011 | Fleischanderl et al. |
| 9,850,553 | B2 | 12/2017 | Work et al. |
| 2002/0000031 | A1 | 1/2002 | Rosasco et al. |
| 2009/0160217 | A1* | 6/2009 | Kimura ............... C21D 6/005 |
| | | | 296/187.03 |
| 2009/0260721 | A1 | 10/2009 | Ohki |
| 2010/0024929 | A1 | 2/2010 | Wozniak et al. |
| 2010/0175452 | A1 | 7/2010 | Ohlert et al. |
| 2010/0319814 | A1 | 12/2010 | Perez et al. |
| 2011/0011499 | A1 | 1/2011 | Lengauer et al. |
| 2011/0016719 | A1 | 1/2011 | Lee et al. |
| 2011/0240177 | A1 | 10/2011 | Eberlein |
| 2014/0027022 | A1 | 1/2014 | Yokoi |
| 2015/0217329 | A1* | 8/2015 | Iwamoto ............... B05D 3/0281 |
| | | | 428/457 |

FOREIGN PATENT DOCUMENTS

| | | |
|---|---|---|
| DE | 10 2011 107 561 A1 | 1/2013 |
| EP | 2562272 | 2/2013 |
| EP | 3172346 | 5/2017 |
| JP | 2007222922 A * | 9/2007 |
| JP | 2007222922 A | 9/2007 |
| WO | 20050110638 A1 | 11/2005 |
| WO | 2012141297 A1 | 10/2012 |
| WO | 2016014424 | 1/2016 |

OTHER PUBLICATIONS

Korean Intellectual Property Office, International Search Report and Written Opinion for PCT/2015/041164 dated Apr. 29, 2016.
Transmittal Letter of Related Cases.

* cited by examiner

SYSTEM AND METHOD FOR PRODUCING A HARDENED AND TEMPERED STRUCTURAL MEMBER

CLAIM TO PRIORITY

This divisional patent application claims priority to and benefit of, under 35 U.S.C. § 121, U.S. patent application Ser. No. 14/337,921, filed Jul. 22, 2014 and titled "System And Method For Producing A Hardened And Tempered Structural Member", all of which is incorporated by reference herein.

TECHNICAL FIELD

Generally, an in-line system and method that produces a hardened and tempered structural member is taught. More specifically, an in-line system and related method that utilizes rapid induction heating and rapid cooling to produce a hardened and tempered structural member with surprisingly minimal distortions. In some embodiments the in-line system and method produces a structural member having uniform physical properties, and in other embodiments a structural member is produced having two or more physical properties present in two or more zones.

BACKGROUND

Heating and cooling of materials, such as steel, can alter the properties of the utilized material used to form finished products such as structural members, including frame rails for motor vehicles such as heavy trucks. Moreover, targeted heating, cooling, other processes, or the combination thereof can alter the properties to targeted properties or parameters. To this end, various processes of heating and/or cooling materials have been developed. However, such processes as are presently known yield structural members with distortions (such as bow or camber, etc.) which are expensive time-consuming to correct. Plus, known systems to harden and or temper metal products such as structural members have proven costly, time consuming, and/or relatively inefficient. Finally, known systems to harden and/or temper metals such as structural members require multiple pieces of equipment positioned separated from one another on large amounts of floor space ("foot print") in a factory, requiring physical transfer of hot metal parts from one processing station to another. Such physical transfer of hot metal parts presents not only a safety issue, but also presents opportunities to introduce additional distortions into the product.

For example, processes to date that utilize heating as well as quenching and/or spraying with cool water of steel generally require large furnaces or ovens for heating and large tanks for rapid cooling, such as by spraying or quenching. As mentioned, such large equipment requires a large amount of floor space ("foot print") or allocation of manufacturing space, which can be expensive as well as inefficient. Moreover, transferring of product between such large equipment is difficult and/or labor intensive. For example, transitioning from a large furnace/oven in one location to a large piece of cooling or quenching equipment in a second location may require transporting the treated equipment from one area of a manufacturing floor to another area (e.g., from a heating area to a quenching area) by fork truck, cargo truck, rail, etc., or even from one manufacturing building to another. This transportation of work pieces from one piece of processing equipment to the next piece of process equipment can be expensive and/or time consuming, leading to increased cost of production, production time, and/or inefficiencies that lower productivity or profit.

Thus, there is a need in the art both for producing a hardened and tempered structural member, and for overcoming issues of existing multiple facility or large foot print systems for producing hardened and tempered structural members with minimal distortions.

SUMMARY

The present disclosure is directed towards systems and methods for in-line hardening and tempering or treatment of materials to produce a structural member, including roll forming the material prior to induction heating and rapidly cooling the structural material to alter the physical properties of the material in targeted ways, including producing two or more physical properties in two or more zones of a single structural member.

Optionally, in some embodiments a hardened and tempered structural member may be produced with uniform or symmetric physical properties throughout, while in other embodiments a hardened and tempered structural member may be produced with different physical properties within a single profile, with physical properties varying in various targeted zones of the structural member (i.e. non-uniform or asymmetric).

Generally, in one aspect, a method for producing a hardened and tempered structural member is disclosed. A ferrous work piece is provided and roll formed into a profiled work piece of selected profile. The profiled work piece is rapidly heated a first time in an induction heating device to above a first temperature, thus forming a first metallurgical phase substantially throughout the profiled work piece. The profiled work piece is rapidly cooled a first time at a first rapid cooling rate from about the first temperature to a second temperature, thereby converting the first metallurgical phase to a second metallurgical phase substantially throughout the profiled work piece, which results in a hardened work piece still having about the selected profile. The hardened work piece is rapidly heated in a second induction heating device a second time to a third temperature, which tempers the hardened work piece, thereby forming a hardened and tempered work piece having the selected profile and a desired hardness. The hardened and tempered work piece may be rapidly cooled a second time at a second rapid cooling rate to a fourth temperature.

Optionally, the first temperature may be in the range of about 800 degrees C. to about 1000 degrees C., and may be about 950 degrees C., and the first metallurgical phase may be austenite. The second temperature may be in the range of about 20-200 degrees C., the second rapid cooling may occur in about 10 seconds or less, and the second metallurgical phase may be martensite. The third temperature may be about 450 degrees C. or higher. The fourth temperature may be about 150 degrees C. or less. The method may be completed in less than about 10 minutes. Powder coating the hardened and tempered structural member may be added as an additional step. The hardened and tempered structural member may be further roll formed or calibrated to reduce distortions therein, before or after powder coating or other steps. Each step of the method may occur substantially continuous and in-line in a straight line. The hardened and tempered work piece may be cut-to-length, and this cutting-to-length may optionally be continuous and in-line with the other continuous and in-line steps, if they are continuous and in-line. The hardened and tempered structural member may be a frame rail. The work piece may be subjected to heating and/or cooling that is substantially symmetric. If heating and/or cooling is symmetrical, hardness may be substantially uniform across zones of the work piece, and/or distortions may be less than about 1 mm/m in the hardened and tempered work piece. Distortions may be measured by an optical device, which, if included, may include a laser. If an optical measuring device is included, it may continuously provide measurement information to a computer, which may determine if there is distortion above an acceptable amount. The computer may activate a calibration device resulting in further roll forming to get any distortions to less than the acceptable amount, which may be about 1 mm/m. The work piece may be subjected to heating, cooling, and/or tempering that is asymmetric at selected zones, which may result in a work piece having selected zones of different hardness. A first zone may include a web, and/or a second or subsequent zone may include one or more flanges.

Generally, in another aspect, a method for producing a hardened and tempered structural member is disclosed. A coiled ferrous work piece of selected composition is provided and roll formed into a desired profile. The ferrous frame rail is rapidly heated to within the range of about 850-1000 degrees C. within about 300 seconds to produce austenite substantially throughout the profile of the work piece. The work piece is rapidly cooled to below about 350 degrees C. within about 10 seconds or less to convert the austenite to martensite substantially throughout the work piece, resulting in a hardened work piece. The hardened work piece is rapidly heated in a second induction heating device to about 450-600 degrees C. within about 40 seconds or less to temper it, resulting in a hardened and tempered work piece having a desired hardness in the form of, for example, a frame rail for a heavy truck. The hardened and tempered work piece may be cooled to a desired cutting temperature. The hardened and tempered work piece (frame rail) may be cut to length as desired, for example, to an exemplary length of 8.53 meters (28 feet). Using the in-line process described herein, an 8.53 meter (28 foot) hardened and tempered frame rail can be produced beginning with coiled steel to completed frame rail within about less than 10 minutes.

Optionally, the hardened and tempered work piece may be powder coating during the process. The composition of the work piece may be SAE 15B27 steel. The work piece may be subjected to substantially symmetrical heating and/or cooling, which may result in minimal distortions resulting from the heating and/or cooling. The work piece may be subjected to asymmetric heating, asymmetric cooling, and/or asymmetric tempering at selected zones of the work piece, which may result in the hardened and tempered work piece having selected zones of differing hardness. A first zone may include a web, and/or a second or subsequent zone may include one or more flanges. Each step of the process may occur substantially continuous and in-line in a straight line, although such an arrangement is optional. Distortions may be measured by an optical measuring device (e.g., a laser) and, if so, it may continuously provide measurement information to a computer, which may determine if there is distortion above an acceptable amount. The computer may activate a calibration device resulting in further roll forming to get any distortions to less than the acceptable amount, which may be about 1 mm/m.

Generally, in yet another aspect, a method for producing a hardened and asymmetrically tempered structural member is taught. A steel work piece of selected composition is provided and roll formed into a profiled work piece. The profiled work piece is rapidly heated a first time in an induction heating device above a first temperature within about 300 seconds, at which point a first metallurgical phase is produced substantially throughout the profiled work piece. The profiled work piece is rapidly cooled a first time at a first cooling rate from about the first temperature to a second temperature to convert the first metallurgical phase to a second metallurgical phase substantially throughout the profiled work piece, which results in a hardened work piece having said desired profile. The hardened work piece is heated rapidly and asymmetrically in a second induction heating device to at least one third temperature to asymmetrically temper the hardened work piece and produce a hardened and tempered work piece having a plurality of temper zones, with each temper zone having a different hardness. The hardened and tempered work piece is rapidly cooled a second time at a second cooling rate to a fourth temperature appropriate for cutting the hardened and tempered structural member into finished length.

Optionally, a first temper zone may include a web, and/or a second or subsequent temper zone may include one or more flanges. Each step may occur substantially continuous and in-line in a straight line, if desired. Distortions may be measured by an optical measuring device, such as a laser. If an optical measuring device is included, it may continuously provide measurement information to a computer, which may determine if there is distortion above an acceptable amount. The computer may activate a calibration device resulting in further roll forming to get any distortions to less than the acceptable amount, which may be about 1 mm/m.

Generally, in a further aspect, a system for in-line processing of coiled steel into hardened and tempered frame rails having minimal distortions is taught. The system includes a feeder station to feed the coiled steel to the components that sequentially process the coiled steel into a tempered frame rail. These components include, in sequential order, a first roll forming station, a first rapid heating induction heating apparatus, a first rapid cooling apparatus, a second rapid heating induction heating apparatus, and a second rapid cooling station. The first roll forming station forms the coiled steel into a desired profile. The first rapid heating induction heating apparatus heats the profiled steel above its austenitizing temperature while the steel is fed therethrough. This converts the metallurgical profile of the steel work piece to austenite substantially throughout. The work piece is fed to the first rapid cooling station which converts the austenite to martensite, and feeds the martensitic work piece to the second rapid heating induction heating apparatus, which tempers the work piece. The work piece is tempered into a hardened and tempered work piece with a desired hardness. The hardened and tempered work piece is fed to the second rapid cooling station where it is rapidly cooled to minimize distortions therein.

Optionally, the work piece may be subjected to substantially symmetric heating at the first rapid heating induction heating apparatus and/or symmetric cooling at the first rapid cooling apparatus. If such heating and/or cooling is symmetric, the desired hardness achieved in the hardened and tempered work piece may be substantially uniform across a plurality of zones of the work piece, and/or distortions in the hardened and tempered work piece may be less than about 1 mm/m. The feeder, roll forming station, both heating apparatus, and both cooling apparatus may be substantially continuous and in-line in a straight line. The system may include a second roll forming station or calibration mill where distortions may be measured by an optical device (e.g., a laser). If an optical measuring device is included, it may continuously provide measurement information to a computer, and that computer may determine if there is distortion above an acceptable amount. If distortion above the acceptable amount is measured and/or determined to exist, a calibration device may be activated. The calibration station may include roll formers, which may be activated by the calibration device if unacceptably high distortions are measured and/or determined to exist, and the roll formers may reduce distortions in the work piece to less than the acceptable amount, which may be about 1 mm/m. The system may include a cutting station wherein the hardened and tempered work piece may be cut to a desired length.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of any present embodiment is provided in the following written description of various embodiments, illustrated in the accompanying drawings, and defined in the appended claims.

DETAILED DESCRIPTION

Figure 1:
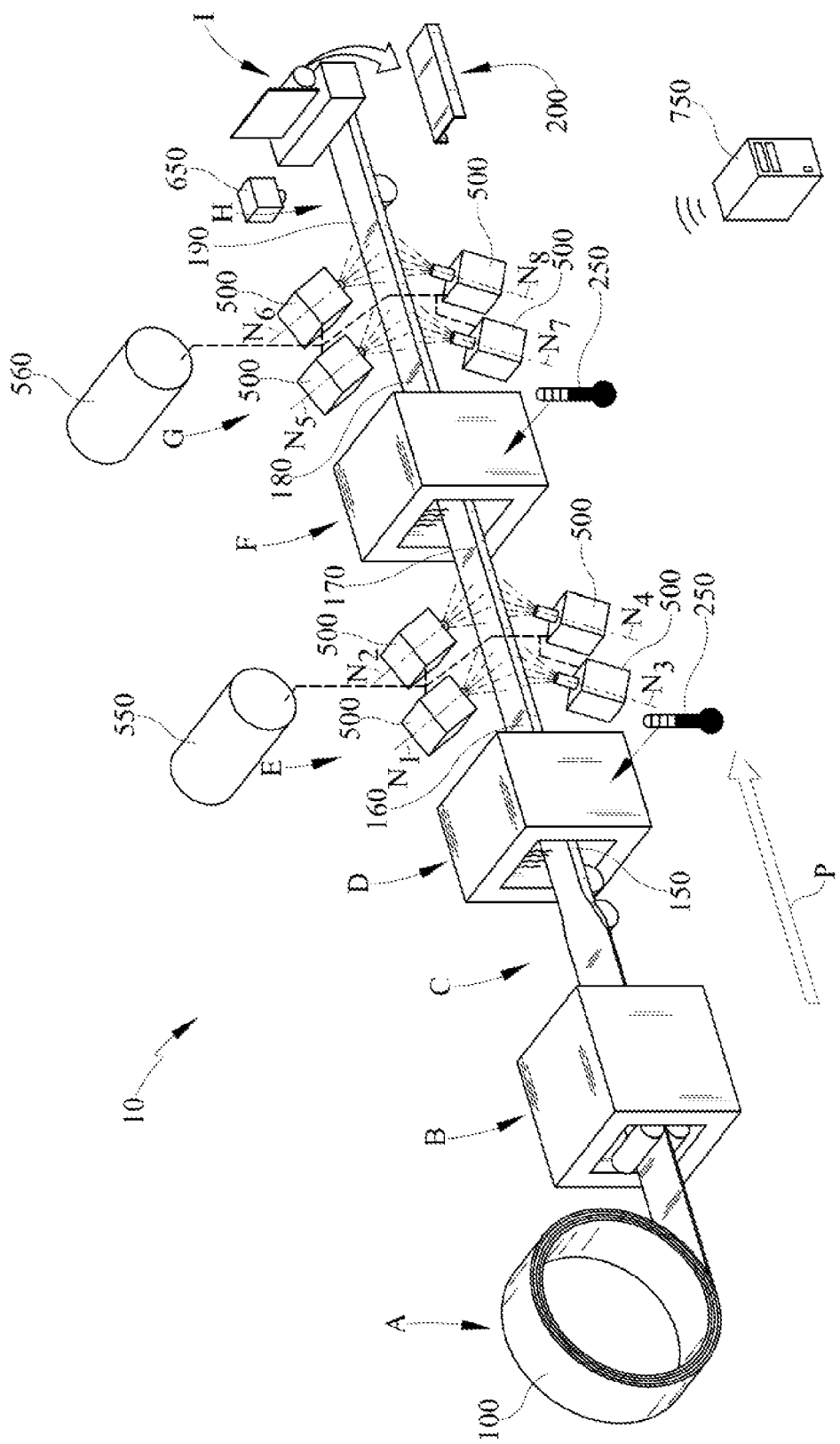
FIG. 1 is a perspective schematic view of embodiments of equipment and a process for in-line tempering and hardening of an exemplary work piece.

It is to be understood that the embodiments are not limited in their application to the details of construction and the arrangement of components set forth in the following description or illustrated in the drawings. Other embodiments are possible and may be practiced or carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections and couplings. In addition, the terms "connected" and "coupled" and variations thereof are not restricted to physical or mechanical connections or couplings.

Referring initially to all figures, embodiments of a system 10 and process for forming a continuous work piece 100 into a finished structural member 200 are depicted. Some exemplary structural members 200 may be any of a variety of frame rails, such as the type commonly used in motor vehicles or the like. The system and/or process is in-line throughout, so that continuous work piece 100 may be linearly advanced without any substantial interruptions due to a substantial absence of separations between portions of the process or steps of the process. This continuity of process shortens process times and decreases the amount of time between processes or stages of the system. Significant amount of time between or after certain stages or process steps can lead to unwanted variability in the properties of continuous work piece 100 and/or finished frame rail or structural member 200. For example, in a non-continuous process, after heating a work piece may be transferred to a rapid cooling station or process step, which presents a safety hazard. Also, during this transfer the work piece may cool in an uncontrolled and/or undesirable manner. Such uncontrolled or undesirable cooling may result in undesirable metallurgic or physical properties and/or geometric distortions being present in the work piece.

Moreover, such discontinuity and/or excessive transfer or transportation process steps will likely result in an inefficient process, taking longer than necessary. Furthermore, a process or system that is not in-line will require more floor space and/or a larger square footage "foot print" than will an in-line process. Thus, an in-line system can result in a safer, smaller, more efficient process that results in an optimized product (e.g., frame rail or structural member 200) having desired metallurgic properties, as well as minimal distortions without requiring extra forming or hammering to remove distortions. Moreover, having the in-line system 10 arranged in a substantially straight line or orientation may further improve efficiency, further reduce the size of the foot print, and/or improve results (e.g., minimize distortions), at least because a straight line orientation may reduce the geometric space required (and/or the distance required for continuous work piece 100 to travel). Furthermore, by keeping continuous work piece 100 continuous, the process may allow for efficient correction of continuous work piece 100 into final shape, form, or profile, for example, by use of conventional roll forming techniques combined with optical measurement (e.g., by an optical measuring device 650) and feedback (e.g., by a computer 750) to a calibration mill (e.g., calibration station H, discussed below), any or all of which may occur with little or no human oversight.

Referring now to FIG. 1, a perspective view of an exemplary in-line system for processing frame rail or structural member 200 from a blank continuous work piece 100. A system 10 provides equipment for processing the continuous work piece 100 into structural member or frame rail 200 having a selected and/or desired profile (e.g., U-shaped channel, I-shaped, Z-shaped box shaped, or other structural shape or combination of shapes, some or all of which may be commonly used as structural members including but not limited to frame rails used in, for example, motor vehicles). Structural member 200 may also have varying or constant metallurgical characteristics or physical properties. For example, the hardness and/or brittleness, yield, elongation, elasticity, tensile strength, and/or shear strength of frame rail or structural member 200 may be altered by certain processing steps imposed on continuous work piece 100. Continuing this example, continuous work piece 100 may be made hard and/or brittle during a first heating and cooling cycle in which austenite/martensite is formed within or throughout continuous work piece 100, and then continuous work piece 100 may be subjected to a tempering process in which the hardness and/or brittleness is reduced (although in some embodiments the work piece 100 may still be harder than before the first heating and cooling cycle and/or before martensite is formed).

Continuous work piece 100 may be provided in any of a variety of forms or having any of a variety of compositions, including, but not limited to, as a roll or coil of SAE 15B27 steel at a supply station A. Continuous work piece 100 may be ferrous, including iron, and/or may include carbon and/or other metals or elements therewith. As used herein, the reference character "A" may be used to denote supply station A or the supplying step A of providing continuous work piece 100 (the same applies for stations or steps B-I, described below). A variety of compositions may be used for continuous work piece 100. For example, boron-manganese steels having compositions with at least one of the alloy elements within the following approximate mass percentage ranges:

| Carbon (C) | 0.08-0.6, | preferably, 0.08-0.30 |
| Manganese (Mn) | 0.8-3.0, | preferably, 1.00-3.00 |
| Aluminum (Al) | 0.01-0.07, | preferably, 0.03-0.06 |
| Silicon (Si) | 0.01-0.5, | preferably, 0.01-0.20 |
| Chromium (Cr) | 0.02-0.6, | preferably, 0.02-0.30 |
| Titanium (Ti) | 0.01-0.08, | preferably, 0.03-0.04 |
| Nitrogen (N) | <0.02, | preferably, <0.007 |
| Boron (B) | 0.002-0.02, | preferably, 0.002-0.006 |
| Phosphorus (P) | <0.01, | preferably, <0.01 |
| Sulfur(S) | <0.01, | preferably, <0.01 |
| Molybdenum (Mo) | <1, | preferably, <1.00 | iron and/or impurities residual.

For example, steels including the following alloy composition have been found suitable for use with embodiments of system 10:

| C [%] | Si [%] | Mn [%] | P [%] | S [%] | Al [%] | Cr [%] | Ti [%] | B [%] | N [%] |
|---|---|---|---|---|---|---|---|---|---|
| 0.22 | 0.19 | 1.22 | 0.0066 | 0.001 | 0.053 | 0.26 | 0.031 | 0.0025 | 0.0042 | the rest being made up of iron and inevitable smelting-related impurities.

For another example, a selected form coil composition may be SAE 15B27 having about 0.25-0.30% carbon, about 0.15-0.30% silicon, about 1.35-1.65% manganese, about less than 0.04% phosphorus, and about less than 0.04% sulfur. It is understood that SAE 15B27 is merely an exemplary type or composition of steel material that may be used, and that any of a variety of other steels may be used (e.g., the carbon and/or manganese content may vary+/−50% from the content of SAE 15B27, and/or compositions in the range of about 20 MnB5 through 30 MnB5 may be used, although these are just additional exemplary compositions), any of a variety of other non-steel or non-metal materials may be used, or any combination thereof. For example, aluminum and/or aluminum alloys may be used, and/or any of a variety of other metals or non-metals instead of or in addition to aluminum or aluminum alloys may be used. It is understood that, although steel is discussed in detail herein, including the formation of austenite and martensite, such description does not limit the materials that may be used to steel or to materials in which austenite or martensite may be formed. Exemplary embodiments comprising rolled sheet steel may have a thickness in the range of about 0.5 mm to 13 mm, and in some embodiments rolled sheet steel having a thickness in the range of about 6 mm-9 mm may be used. The coil profile or shape defines the starting profile of continuous work piece 100, which is unrolled and fed to a subsequent feeder station B using equipment well known in the art.

Feeder station B may be provided to supply continuous work piece 100 from supply station A to subsequent steps of the process or method and/or to subsequent portions of the system for producing structural member 200. In one embodiment, the feeding of continuous work piece 100 through the stages of the in-line system 10 is accomplished by a standard roll-forming line as will be understood in the art. Any of a variety of feed rates may be used, without limitation, although in some embodiments feed rates in the range of about 2.5-9 meters/minute may be used. It is understood that the feed rate may be based on the limitations of other equipment, stations, or steps in the process, such as, for example, the power available to the first rapid heating station D and/or the second rapid heating station F, and/or the spray rates or flow rates at first rapid cooling station E and/or the second rapid cooling station G. The feeding accomplished by roll former acting as feeder station B may be augmented by a calibration mill H at the end of the process. Further, the feeding may also be assisted by driven rolls at various stages along the process flow, such driven rolls operating in a manner understood by those skilled in the art. In some embodiments, continuous work piece 100, en route to becoming structural member 200 (for example along processing direction P), may be formed at roll forming step C, heated at induction heating step D, rapidly cooled and/or quenched at cooling step E, rapidly heated at tempering step F, rapidly cooled and/or quenched at cooling step G, cut and/or otherwise processed in any of a variety of ways to, for example, be infused with desired or target properties and/or to be shaped or formed as desired. Optionally, regarding the cooling step G, the work piece may be simply allowed to cool ambiently before being calibrated at station H and then cut to length at station I.

Optionally, feeder station B may include any or all of an uncoiler (not shown), a peeler (not shown), and a flattener (not shown) to, for example, facilitate feeding continuous work piece 100 to and/or through system 10. For example, an uncoiler, if included, may process a coiled or spooled roll of material through a straight or in-line orientation. A peeler and/or a flattener may further process continuous work piece 100 into a shape or form (e.g., straightened, flattened, cleaned, and/or cleared of debris). Optionally, a cut-off device (not shown) may be included, for example, so that continuous work piece 100 may be cut between feeder station B and roll former C or subsequent station or step, which may facilitate a safer operation and/or to prevent waste should there be a problem with a production run. It is understood that any or all of an uncoiler, a peeler, a flattener, and a cut-off device may be separate units instead of or in addition to being included as a part of feeder station B or any other station of system 10.

The system 10 and/or process may involve or include in-line processing, which may mean that the components of the system are arranged contiguously in a straight line and are connected to each other allowing for the work piece to be processed continuously from the beginning continuous work piece 100 (e.g., strip steel) stage to the final or structure member 200 (e.g., a hardened and tempered frame rail) stage, without the need for collateral transfer of the work piece from one processing component to the next. Use of an in-line system or process may allow for, among other things, a smaller foot print and/or may require less area for setting up or operating the system or process, a more efficient process, and/or a finished product (e.g., structural member 200) having minimal distortions without the need for extra forming or straightening steps.

An unexpected benefit of the in-line process of FIG. 1 is that distortions are minimized to a surprising degree without employing some means of restraint quenching as required in the prior art.

Distortion may be used to denote cross-sectional changes in continuous work piece 100 and/or frame rail or structural member 200. For example, deviations in shape or profile of continuous work piece 100 and/or structural member 200 (e.g., changes in angle of side flanges, if flanges are included, or changes in thickness over the width) may be distortions. It has been found that, with some materials and/or target designs of structural member 200, less than 1 mm/m (e.g., about less than 0.75 mm/m) may be desirable. Distortion may be measured in any of a variety of ways, including, but not limited to, by visual inspection and/or by tools (e.g., calipers, optical measuring systems, and/or optical measuring device 650). In some embodiments, feedback from measuring may be supplied to system 10 (e.g., to a calibration mill or straightening equipment, as is understood in the art) to make necessary or desired adjustments to continuous work piece 100 and/or structural member or prior to cut off into final frame rail 200.

Optical measuring device 650 (shown schematically in FIG. 1) may include any of a variety of optical measuring components, such as, for example, a camera, a magnifying lens, a laser, a sensor (e.g., an analog or digital sensor), a communication device (e.g., a transceiver, a radio, a computer, etc.), other components, or any combination thereof, including a plurality of one or more components. Optical measuring device 650 may be used either alone or in conjunction with other components to, among other things, measure distortion in continuous work piece 100. Computer 750 (also shown schematically in FIG. 1) may be included and/or may be in communication with optical measuring device 650, and/or may be in communication with system 10 or any component thereof to, for example, control the feed rate of continuous work piece 100. Thus, for example, optical measuring device 650 may measure distortion(s) in continuous work piece 100 and/or computer 750 may receive such measurement information and use it to determine if distortions exist that are above an acceptable level (e.g., more than about 1 mm/m).

Computer 750 may then communicate with system 10 or components thereof to, for example, reverse or slow continuous work piece 100 for further processing and/or communicate to calibration station H to cause further roll forming, straightening, and/or reduction of distortion(s) until below an acceptable distortion level (e.g., equal to or less than about 1 mm/m). It is understood that further roll forming, straightening, and/or reduction of distortion(s) in continuous work piece 100 may be repeated as necessary, for example, by use of a feedback loop including optical measuring device 650, computer 750, calibration station H, and/or other components of system 10 or any combination thereof. It is further understood that computer 750 may be in communication with any or all stations of system 10 and/or may be used to control functions thereof. For example, computer 750 may be in communication with feeder station B to control the feed rate of continuous work piece 100. For another example, computer 750 may be in communication with any of the heating stations (e.g., D and/or F) and/or in communication with any of the cooling stations (e.g., E and/or G) to receive temperature feedback to adjust heating or cooling rates (e.g., as described above) and/or to adjust the feed rate of continuous work piece 100 as desired. It is understood that any or all communication between optical measuring device 650, computer 750, and/or any component of system 10 or any combination thereof may be substantially wireless or wired, or any combination thereof.

Fine tuning or precise control of any or process steps may minimize or eliminate unwanted distortions, for example, by fine tuning the heating, cooling, and/or tempering processes. For example, any or all of heating, cooling, and tempering steps or processes may be substantially symmetrical, or subjecting substantially all of a lengthwise section of continuous work piece 100 to substantially the same heating or cooling rates, which may reduce thermal gradients and/or stresses, and thereby reduce distortions that may arise from uneven heating or cooling. However, it is understood that asymmetric heating, cooling, and/or tempering may be desired, in some embodiments, to give continuous work piece 100 and/or structural member 200 variable properties, as discussed in more detail below. Moreover, distortion may be reduced or eliminated by, for example, reducing or eliminating restraints or physical touching of continuous work piece 100 during any or all processing steps. Further still, guides, such as guide rolls or guide rails, for example, may be included, for example, between process steps or stations. For example, radiant cooling of continuous work piece may occur upon exit of first rapid heating station D and/or second rapid heating station F, and this radiant cooling may cause or increase distortions. Thus, guides may be used at these locations (or at any other location) to urge continuous work piece to maintain its desired profile and minimize distortions.

Referring still to FIG. 1, roll forming step C is accomplished following feeder station B. Feeder station B, if included, may provide continuous work piece 100 to a forming station C. Forming station C may shape or form continuous work piece 100 into a certain, predetermined, and/or desired shape or profile (e.g., the substantially U-shaped channel shown in FIG. 1, or other shape if desired). Other shapes that profiled work piece 150 may take include, but are not limited to, I-shape, Z-shape, box shape, or any other shape or any combination thereof. It is understood that continuous work piece 100 and/or structural member 200 may have, without limitation, any form or shape, whether having an open shape (i.e. an open perimeter) or a closed shape (i.e. a closed perimeter, such as may be achieved by welding the perimeter shut, for example, or by supplying a continuous work piece 100 having a closed shape or form prior to processing by system 10).

Forming station C may include any of a variety of forming methods, such as roll forming. Roll forming may facilitate and/or efficiently shape or form continuous work piece 100 into or toward the finished profile or shape desired. For example, roll forming at forming station C may facilitate forming and/or efficiently form continuous work piece 100 if continuous work piece 100 is steel such as SAE 15B27. If roll forming is employed at forming station C, it may shape or form continuous work piece 100 in a single step or in a plurality of steps in a manner understood in the art. For example, a first or intermediary roll forming step at a first pair of rollers may be followed by a final or finishing step at a second pair of rollers. As mentioned above, exemplary embodiments comprising rolled sheet steel may have a thickness in the range of about 0.5 mm to 13 mm, and in some embodiments rolled sheet steel having a thickness in the range of about 6 mm-9 mm may be used.

It is understood that any number of rolling steps or pairs may be included, and the rollers are not limited to being in pairs. The number of rollers and/or the orientation of rollers may be adapted as necessary to, for example, form a finished shape or profile from a certain or predetermined blank or beginning profile. According to present exemplary embodiments, the continuous work piece 100 is formed by creating side flanges in two or more steps to create the exemplary U-shaped channel. As shown in the exemplary embodiments, the flanges are turned downward to preclude pooling of water between the web and flanges of the shaped work piece 150 which may affect cooling and/or subsequent heating step after a first cooling. Once formed, continuous work piece 100 takes the form of exemplary profiled work piece 150 (for non-limiting example, channel-shaped). It is understood that profiled work piece 150 is used to indicate a state of continuous work piece 100, and is not a separate piece, as continuous work piece 100 is continuous throughout the in-line process(es) described herein.

After being shaped or formed at forming station C the profiled work piece 150 may be rapidly heated at exemplary first heating station D. Any of a variety of heating methods, systems, and/or apparatus may be used at first heating station D, including, but not limited to induction heating, heating in a gas or electric oven, and/or infrared heating. In some embodiments, induction heating may be a quick, efficient, and/or compact heating option. One induction heating device that has proven to be useful in this in-line process is an AJAX TOCCO Magnathermic induction heating device, although it is understood other makes and/or models may be employed. Coil design and flux field are considerations that may be taken into account when selecting a type, make, and/or model of heating device. The coils of the induction heating device may be manipulated and/or formed to adapt or conform to the profile or shape of profiled work piece 150 that is being processed into structural member 200 (see, e.g., FIGS. 4-6A, discussed below). The properties and/or metallurgy of continuous work piece 100 may be altered, varied, and/or controlled by altering, varying, and/or controlling, for example, the power to any or all coils or the spacing of the coils relative to the profiled work piece 150. If more than one coil is included, power to each coil may vary, for example, to create varying metallurgy in adjacent sections of continuous work piece 100. Profiled work piece 150 may enter first heating station D and exit as first heated work piece 160. Again, it is understood that first heated work piece 160, as used here, denotes the state of continuous work piece 100 at that location along the continuous in-line process, not a separate piece of material.

First heated work piece 160 may have certain, predetermined, and/or target properties that may be achieved, for example, by heating profiled work piece 150 to a desired temperature and/or at a desired rate. In some embodiments (possibly depending on the type of material forming continuous work piece 100), induction heating may be used at first heating station D to heat continuous work piece 100 as desired in less than 5 minutes (300 seconds), less than about 3-4 minutes (180-240 seconds) in some embodiments, or less than about 60-90 seconds in some embodiments.

Although other types of heating may be used at first heating station D, such as gas heating (e.g., in an oven) or infrared heating, induction heating may require less space, less time, and/or less energy, and thus induction heating may optimize process efficiency. Induction heating may, for example, be used to develop heat within profiled work piece 150 relatively instantaneously, instead of waiting for heat to be transferred therein by conduction or convection from heat sources outside profiled work piece 150. Moreover, the depth of heating may be controlled with an induction heating device, for example, by altering the frequency of the current used in the induction process (wherein lower frequencies may be used to reach greater depths and higher frequencies may be used for lesser depths). In some embodiments heating steel by induction, frequencies may range from about 500 Hertz to about 400 kilohertz, and about 3,000 to about 10,000 Hertz has commonly found to be an effective frequency range. The shortened time period that may be required for induction heating (as compared to other methods of heating) may improve accuracy and/or control of the heating process, for example, due to reducing the time over which accidents or errors resulting in unwanted variation of line speed, voltage, power, or other parameters that may affect the precision of the process may occur. In some embodiments, pyrometers or similar devices may be used during or near the first heating process or first heating station D to collect data and/or provide feedback, which may be used, for example, to control and/or to ensure target properties such as certain metallurgy.

Typically, profiled work piece 150 is heated to a first temperature at which a first hardened metallurgical phase such as austenite is formed. As will be understood by those of ordinary skill in the art, austenite is, generally, a solid solution of carbon in iron that is stable at relatively high temperatures. The time and temperature required to produce the desired first metallurgical phase is controlled by a number of parameters, such as material chemistry (e.g., steel chemistry), feed rate, power, wattage, coil positioning, range of frequencies, and power ranges of the various coils, the mass flow rate associated with the process, etc., as shown, for example, in the Examples set forth hereinafter. For example, first heating station D may heat continuous work piece 100 and/or first heated work piece 160 to a first temperature of about 950 degrees C. (or within the range of 800 degrees C. to 1000 degrees C.) to be subsequently cooled, as discussed in more detail below. If steel is used, sufficient heat may austenitize some or all of the ferrite therein, changing the crystal structure from (body centered cubic) ferrite to (face centered cubic) austenite. Ferrite typically exists in steel from about room temperature (or cooler) to about 720-730 degrees C., at which point the ferrite begins to change to austenite under equilibrium conditions. Typically, in conventional gas or electric ovens, the ferrite in a medium carbon steel will completely or nearly completely be transformed to austenite at about 850 degrees C. However, since induction heating time is typically relatively short compared to other heating methods, it has been found that raising the temperature to achieve austenitization may facilitate and/or help ensure complete austenitization. It has been found that raising the target austenitization temperature about 100 degrees C. is often sufficient (e.g., from about 850 degrees C. in other heating methods to about 950 degrees C., as mentioned above, in induction heating methods). For selected steel compositions, such as SAE 15B27, continuous work piece 100 may have a tempering range from about 850 degrees C. to about 1000 degrees C.

First heated work piece 160 may be rapidly cooled, sprayed, and/or quenched at exemplary first rapid cooling station E and/or may exit first rapid cooling station E as exemplary first rapidly cooled work piece 170 at a second temperature. Rapid cooling of austenitized steel, for example, such as may be accomplished by symmetric spraying or quenching (see, e.g., FIG. 7B), if sufficiently rapid, will transform the austenite to (body centered tetragonal) martensite. As will be understood by those of ordinary skill in the art, martensite is, generally, a relatively hard and brittle solid solution of carbon in iron. If the cooling is not sufficiently rapid, the transformation from austenite to martensite may be incomplete or may not occur at all, and/or the austenite may instead cool slowly back into ferrite (and thus may have ferritic properties instead of martensitic properties, wherein martensite, for example, is generally significantly harder than ferrite). Any of a variety of cooling and/or quenching methods, systems, and/or apparatus may be used at first rapid cooling station E, including, but not limited to spray quenching (such as by spraying water and/or emulsion, for example, onto first heated work piece 160 to rapidly cool it), dipping or submerging in a pool or bath, or any combination thereof. In some embodiments, symmetrical spray cooling has provided optimal cooling rates and precision, although it is not required to be used at first rapid cooling station E and/or in system 10. Moreover, water has been found to be an efficient and economical quenching medium for use at first rapid cooling station E. Other exemplary quenching media may include emulsions, polymer quenchants (e.g., polyalkylene glycol), and/or other media instead of or in addition to water. For example, emulsions and/or polymers may be added to the sprayed water to, for example, lower the heat extraction rate, which may help minimize distortion and/or cracking of continuous work piece 100. It is understood that it may be desirable at times to have a higher heat extraction rate, and thus it may be desirable to spray a medium that does not have emulsions and/or polymers added thereto. First rapidly cooled work piece 170 may have certain, predetermined, and/or target properties that may be achieved, for example, by cooling or quenching first heated work piece 160 to a desired temperature and/or at a desired rate.

First rapid cooling station E may include one or more upper nozzles and/or one or more lower nozzles, and/or one or more quench rings having spray nozzles or features. The nozzles may be designed, located, and/or oriented to cool first heated work piece 160 with desired or target properties, and/or the nozzles may maintain distortion of first heated work piece 160 within acceptable ranges. Spray rates may be varied, any number of nozzles may be used, and the spray rate may vary from nozzle to nozzle, if more than one nozzle is used. In embodiments utilizing one or more nozzles, location of the nozzle(s) as close the exit of first heating station D as possible (e.g., as close to the final austenitizing coil as possible) may be beneficial. For example, locating the nozzle(s) less than about 30 cm, or within about 15 cm in some embodiments, from the exit and/or final austenitizing coil of first heating station D may be desirable for any of a variety of reasons, including, but not limited to, improved control and/or precision of the cooling, quenching, and/or martensite producing process(es). The spray nozzle (s) at first rapid cooling station E, if included, may have respective nozzle axes $N_1$-$N_4$, any or all of which may be oriented between 0 and 90 degrees, and/or at about 45 degrees, away from first rapid heating station D. Orienting nozzles 500 as such may, for example, help overcome vapor pressure from excessively building up during the rapid cooling process in order to maintain desired heat transfer and to optimally form martensite, and/or such orientation of nozzles 500 may reduce or prevent spray from getting first heating station D or any component thereof (e.g., heating coil(s) or electrical components) wet. It is understood that the precise orientation of nozzles 500 and/or any or all nozzle axes $N_1$-$N_4$ may depend on a number of factors, including, but not limited to, location of first rapid heating station D relative to first rapid cooling station E, the composition and/or thermodynamic properties of continuous work piece 100, and/or the target metallurgical profiles and/or physical properties of continuous work piece 100. If desired, coolant, such as water, may be provided to first rapid cooling station E and/or nozzle(s) 500 by or from by or from one or more sources (e.g., first storage tank 550 and/or second storage tank 560). Storage tanks 550, 560 are merely exemplary and provided as one example of how coolant and/or water may be supplied or provided.

Exemplary spray at first rapid cooling station E may be in the range of about 20-50 degrees C. If used, for example, in an eight nozzle configuration having the spray rate(s) described above, continuous work piece 100 (depending on size, shape, material, etc.) may be cooled from about 950 degrees C. down to a second temperature (within the range of about 20-200 degrees C.), within about 10 seconds. For some material compositions of continuous work piece 100, cooling to about 150 degrees C. within about 10 seconds may be needed to create or form desired properties (e.g., a martensitic state) within continuous work piece 100. Cooling or quenching, for example, through the use of nozzles, may be substantially symmetrical or substantially uniform across continuous work piece 100 as measured in the axial direction and/or the transverse direction. Alternatively, cooling or quenching may be substantially asymmetrical, with different areas or zones of continuous work piece 100 having varying metallurgic properties resulting from varying cooling or quenching (e.g., due to variant cooling rates, liquid types, nozzle design or orientation, varying spray rates, or any combination thereof). It is understood that the rate of cooling and/or the end temperature for first rapidly cooled work piece 170 may be dependent on the heating that occurs at first heating station D, or may be independent of the heating that occurs at first heating station D. It is further understood that a uniform, even, and/or steady flow (and/or use of maximized hole density in the spray nozzle(s)) from each nozzle may help, for example, to optimize cooling control and/or precision.

First rapidly cooled work piece 170 may enter rapid heating or tempering station F (which in some embodiments may be a second induction heating device similar to induction heating station D) and/or may exit tempering station F as, for example, hardened and tempered work piece 180. Tempering station F may provide tempering of first rapidly cooled work piece 170, and such tempering may include heat treating of first rapidly cooled work piece 170 (again, 170 is reference to a section or state of continuous work piece 100 at a particular location along in-line process, not a separate work piece) to increase the toughness of continuous work piece 100 and/or final structural member 200. Hardened and tempered work piece 180 may have certain, predetermined, and/or target properties that may be achieved, for example, by heating first rapidly cooled work piece 170 to a desired temperature and/or at a desired rate to produce a tempered metallurgical profile. It is understood that the rate of heating and/or the end temperature for hardened and tempered heated work piece 180 may be dependent on the heating that occurs at first heating station D and/or the quenching or cooling that occurs at first rapid cooling station E, or may be independent of any heating or cooling that previously occurs.

Any of a variety of heating methods, systems, and/or apparatus may be used at tempering station F, including, but not limited to induction heating. Although any of a variety of types and/or combinations of heating may be used at tempering station F, such as gas or electric heating (e.g., in an oven) or infrared heating, induction heating may require less space, less time, and/or less energy, and thus induction heating may optimize process efficiency. Moreover, the shortened time period that may be required for induction heating (as compared to other methods of heating) may improve accuracy and/or control of the heating process, for example, due to reducing the time over which accidents or errors resulting in unwanted variation of line speed, voltage, power, or other parameters that may affect the precision of the process may occur. Furthermore, since tempering may require a relatively high heating rate (i.e. a lot of heat input quickly), even a slight variation in a target heating parameter (e.g., line speed or power) may have a significant, and possibly detrimental, impact on the tempering of continuous work piece 100.

In some embodiments, for example, using steels of the compositions mentioned above, the tempering step and/or tempering station F may raise the temperature of continuous work piece 100 about 250 degrees C. (from, for example, about 150-200 degrees C. as it may leave first rapid cooling station E) to a third temperature in the range of about 450-600 degrees C., within about less than a minute. In some embodiments, pyrometers (shown schematically as 250) or similar devices may be used during or near the tempering process or tempering station F to collect data and/or provide feedback, which may be used, for example, to control and/or to ensure target properties such as certain metallurgy. Tempering station F may include one or more heating elements and/or coils. The properties and/or metallurgy of continuous work piece 100 may be altered, varied, and/or controlled by altering, varying, and/or controlling, for example, the power to any or all coils. If more than one coil is included, power to each coil may vary, for example, to create varying metallurgy or temperatures in adjacent sections of continuous work piece 100.

Hardened and tempered work piece 180 may be rapidly cooled and/or quenched at exemplary second rapid cooling station G and/or may exit second rapid cooling station G as exemplary tempered and cooled work piece 190. Tempered and cooled work piece 190 may be used to form a hardened and tempered frame rail, such as hardened and tempered structural member or frame rail 200. Any of a variety of cooling and/or quenching methods, systems, and/or apparatus may be used at second rapid cooling station G, including, but not limited to spray quenching such as by spraying water, for example, onto hardened and tempered work piece 180 to rapidly cool it. Second rapid cooling station or step G may be included for any of a variety of reasons, including, but not limited to, making continuous work piece 100 safer to handle, to increase the dimensional stability of continuous work piece 100, and/or to reduce or draw out residual thermal stress(es). If continuous work piece 100 is rapidly cooled at second rapid cooling station G, then subsequent processing, forming, and/or shaping steps (e.g., further roll forming, straightening, calibrating, and/or cutting to length) can be performed without further distortion resulting from a hot continuous work piece 100 cooling later in the process and/or cooling asymmetrically or non-uniformly.

Tempered and cooled work piece 190 may have certain, predetermined, and/or target properties that may be achieved, for example, by rapidly cooling or quenching hardened and tempered work piece 180 to a desired temperature and/or at a desired rate to produce a substantially uniform metallurgical profile. It is understood that the rate of cooling and/or the end temperature for hardened and tempered and cooled work piece 190 may be dependent on the heating that occurs at first heating station D and/or at second heating station, and/or the cooling that occurs at first rapid cooling station E, or may be independent of any heating or cooling that previously occurs. It is understood that second rapid cooling station and/or second rapid cooling step G is optional. For example, ambient cooling and/or ambient air temperatures may be used to continuous work piece 100 after it has been tempered. However, it is understood that, in some embodiments, use of a rapid cooling station or process step after tempering may allow for use of a smaller foot print because less product will need to be cooled simultaneously, and/or it may allow for a quicker or more efficient process or system 10.

Spray rates may be varied, any number of nozzles may be used, and the spray rate may vary from nozzle to nozzle, if more than one nozzle is used. The spray nozzle(s) 500 at rapid cooling station G, if included, may have respective nozzle axes $N_5$-$N_8$, any or all of which may be oriented between 0 and 90 degrees, and/or at about 45 degrees, away from tempering station F. Orienting nozzles 500 as such may, for example, be done in such a way to overcome vapor pressure from excessively building up during the rapid cooling process in order to maintain desired heat transfer, and/or such orientation of nozzles 500 may reduce or prevent spray from getting second rapid heating or tempering station F or any component thereof (e.g., heating coil(s)

or electrical components) wet. It is understood that the precise orientation of nozzles 500 and/or any or all nozzle axes $N_5$-$N_8$ may depend on a number of factors, including, but not limited to, location of tempering station F relative to first rapid cooling station E, the composition and/or thermodynamic properties of continuous work piece 100, and/or the target physical properties of continuous work piece 100. If desired, coolant, such as water, may be provided to second rapid cooling station G and/or nozzle(s) 500 by or from one or more sources (e.g., first storage tank 550 and/or second storage tank 560). Storage tanks 550, 560 are merely exemplary and provided as one example of how coolant and/or water may be supplied or provided.

Moreover, in some embodiments, second rapid cooling station G may not significantly impact or alter the metallurgy or continuous work piece 100 (e.g., changing from austenite to martensite as in some exemplary embodiments of first heating station D and first rapid cooling station E), and thus may allow for more variability and/or less precision. For example, second rapid cooling station G may cool continuous work piece 100 to a temperature that is appropriate for subsequent handling or treatment (e.g., painting, levelling, calibration, powder coating, or other treatment, or any combination thereof). Continuing this example, second rapid cooling station G may cool continuous work piece 100 to an exemplary fourth temperature of about 150 degrees C. or less, and/or to about 40 degrees C. or less. The fourth temperature, or cutting temperature, may be sufficiently low to, for example, cut or allow cutting of continuous work piece 100 without adding more than nominal distortions thereto.

The substantially continuous, in-line process described herein may allow for a smaller foot print, taking up less manufacturing floor space, at least due to the elimination or reduction of transportation of the work piece from station to station (or process to process). This continuous, in-line process allows continuous work piece 100 to move directly from one station to the next. This continuous, in-line process is also more efficient as a result of this direct transfer, as unwanted or uncontrolled changes in temperature between stations is minimized, if not altogether eliminated. Moreover, the minimization or elimination of such unwanted or uncontrolled temperature changes (and/or associated property changes) has unexpectedly and surprisingly resulted in minimized distortions that would otherwise form in the work piece and/or the finished product. Thus, use of this continuous, in-line process may eliminate or minimize the need for post-process forming, hammering, and/or shaping of the work piece. Furthermore, variation of one or more steps of the process described herein, and/or variation of parameters at one or more station A-I may allow for variation of the properties of frame rail or structural member 200. Further still, such variation may occur within a single continuous work piece 100 to cause variable properties within a single continuous work piece 100 and/or a single structural member 100 varying the parameters at one or more station A-I or one or more processing step (e.g., heating, cooling, tempering, and/or forming).

In some embodiments, tempered and cooled work piece 190 may be transported down the line, for example, by or through calibration station H to cutting station I, which may cut tempered and cooled work piece 190 to length resulting in the exemplary frame rail or structural member 200 shown. Calibration station H may be included, for example, to measure and/or further process continuous work piece 100 before it is cut to length. Calibration station may include, for example, measuring equipment to find distortions or profile deviation in continuous work piece 100 and/or to further roll form, straighten, and/or shape continuous work piece 100. It is understood that calibration station H and cutting station I are optional and exemplary only. It is further understood that calibration station H and/or cutting station I may be included at virtually any stage along processing direction P instead of or in addition to the locations shown. For example, in some embodiments location of cutting station I and/or calibration station H after forming station C and/or before any heating or cooling occurs may be desirable, for example if an error occurs and the process needs to be ended and/or re-started. Calibration station H may include any of a variety of handling devices or processes, including, but not limited to, conveyers, rollers, belts, or any guide or transport device, or any combination thereof. Cutting station I may include any of a variety of devices or processes for cutting structural member 200 to length, including, but not limited to, blades, saws, torches (e.g., blow torches), or hydraulic or plasma cutting implements, or any combination thereof. Optionally, a station may be added or included for powder coating or otherwise coating structural member 200, for example frame rail or at any time during or after process P. It is understood that any of a variety of other steps or system components may be added or substituted.

Figure 2:
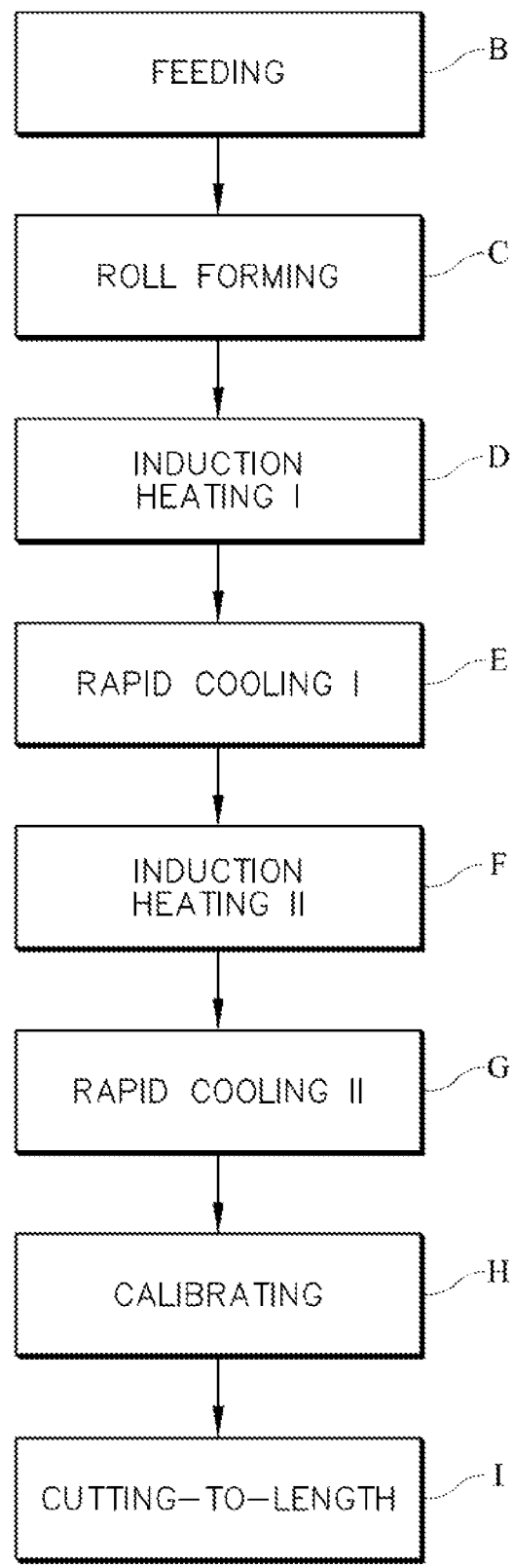
FIG. 2 is a flow chart of an exemplary in-line manufacturing process for a structural member including a tempering process.

Referring now to FIG. 2, a flowchart is depicted showing the steps of a method carried out through use of exemplary system 10 of FIG. 1. Progressing in the process direction P shown in FIG. 1, which may be modified as desired, the feeder step B may occur (e.g., as described above) to provide continuous work piece to the roll forming step C and/or to subsequent steps. Continuous work piece 100 may be formed or shaped as desired prior to being heated, cooled, or tempered, which may facilitate and/or improve the efficiency of shaping or forming continuous work piece 100. After forming continuous work piece 100 into a desired shape or profile, it may be heated, such as by induction heating step D. As described above, the first or subsequent heating or induction heating steps or stations may be designed and/or controlled to impart to the work piece certain targeted properties, which may work in conjunction with the first or subsequent cooling or quenching step(s) to give the work piece certain, desired, and/or target properties. For example, if continuous work piece 100 is steel of the type SAE 15B27, heating the steel to a substantially high temperature in the first induction heating step may form austenite (e.g., by heating to or above about 900 degrees Celsius). Continuing this example, rapidly cooling the (austenitic) steel in the first rapid cooling step E may result in the formation or production of martensite, which may be formed substantially throughout the material and/or result in substantially hardened material. The martensitic continuous work piece 100 may then be tempered at tempering station F to decrease the hardness, increase the toughness, and/or increase the workability of continuous work piece 100, for example, as described above (e.g., may be targeted, symmetric, asymmetric, etc.). Optionally, a second rapid cooling, spraying, and/or quenching step G may occur at second rapid cooling station G for any of a variety of reasons, including, but not limited to, cooling continuous work piece 100 to a temperature conducive for handling and/or to further alter its material properties. For example, second rapid cooling step G may cool continuous work piece 100 to a temperature that is safe to handle and that has minimal or no residual thermal stress prior to reaching a calibrating step H. Calibrating step H may, for example, include measuring, further shaping (e.g., by further roll forming and/or straightening) to more precisely shape continuous work piece 100

(e.g., within given tolerances) and/or to remove or minimize distortions. Cut-to-length step I may, in some embodiments, be included to cut continuous work piece 100 to length to form a finished product such as structural member or frame rail 200. It is understood that other process steps may be added, such as, for example, powder coating continuous work piece 100 and/or frame rail 200. Powder coating, if it occurs, may occur virtually anywhere, but in some embodiments may occur after calibrate step H (if included) and/or after cut-to-length step I (if included).

Subsequent heating and/or cooling of the material may occur for any of a variety of reasons. Continuing the above example in which martensite is formed, a second stage of heating may occur to temper the (martensitic) steel. For example, heating to about the range of 400-450 degrees Celsius may substantially temper the steel and/or make it more workable and/or give it desired properties (e.g., hardness and/or brittleness, yield, elongation, elasticity, tensile strength, and/or shear strength). It is understood that martensitic steel can be very hard or brittle, and often may be difficult to work, shape, form, cut, etc. A second or subsequent cooling stage may be included for any of a variety of reasons, including, but not limited to, cooling the tempered steel to remove and/or minimize distortions therein.

Figure 3A:
FIG. 3A is a front view of an exemplary embodiment of a continuous work piece of material.
Figure 3B:
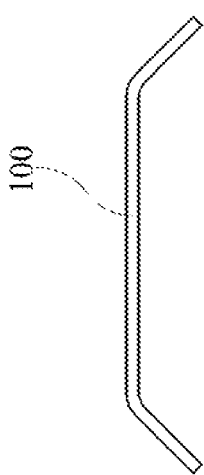
FIG. 3B is a front view of an exemplary embodiment of the continuous work piece of FIG. 3A having an intermediate process profile.
Figure 3C:
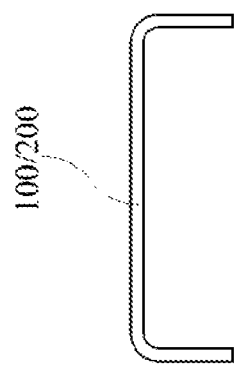
FIG. 3C is a front view of an exemplary embodiment of the continuous work piece of material of FIG. 3B in the desired form of a structural member having a finished process profile.

Referring now to FIGS. 3A-3C, exemplary embodiments are shown illustrating an exemplary progression of shaping an exemplary continuous work piece 100 having the profile shown in FIG. 3A, into an intermediate profile shown in FIG. 3B (which may occur after shaping or forming begins such as at a first pair of rollers, but before the final stage of shaping or forming occurs if there is a second or subsequent stage of shaping such as at a second pair of rollers). In some embodiments, some or substantially all forming or shaping that occurs during exemplary process P may occur before any or all heating and/or cooling occurs. For example, if continuous work piece 100 is steel, it may be difficult to roll form or otherwise form the material after heating or cooling has occurred (e.g., it may be difficult to form first heated work piece 160, first rapidly cooled work piece 170, hardened and tempered work piece 180, and/or tempered and cooled work piece 190, and thus may be easier to form or cut the work piece as continuous work piece 100, as profiled work piece 150, and/or any other work piece state prior to substantial heating, cooling, and/or quenching). Thus, in some embodiments, frame rail or structural member 200 may take its final shape, or substantially its final shape, as profiled work piece 150, prior to the first stage of heating or cooling, such as occurs at first heating station D resulting in first heated work piece 160.

Figure 5:
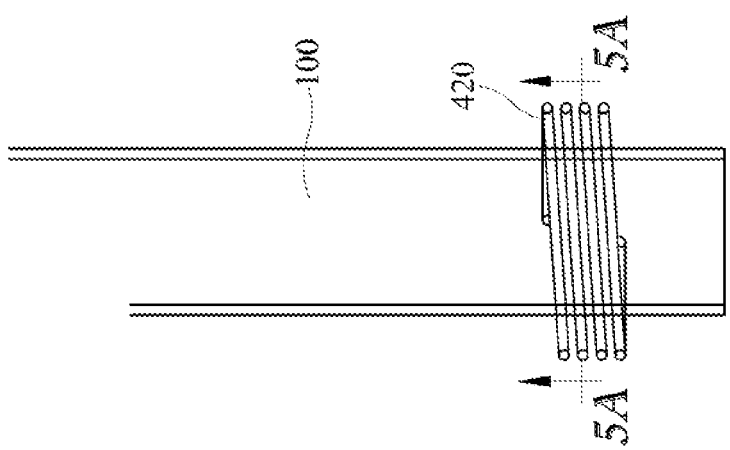
FIG. 5 and FIG. 5A are, respectively, top and cross section (along line 5A-5A) views of an alternative arrangement of an exemplary induction heating coil acting upon the work piece during the in-line process for producing a structural member.
Figure 5A:
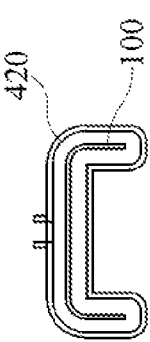
Figure 4:
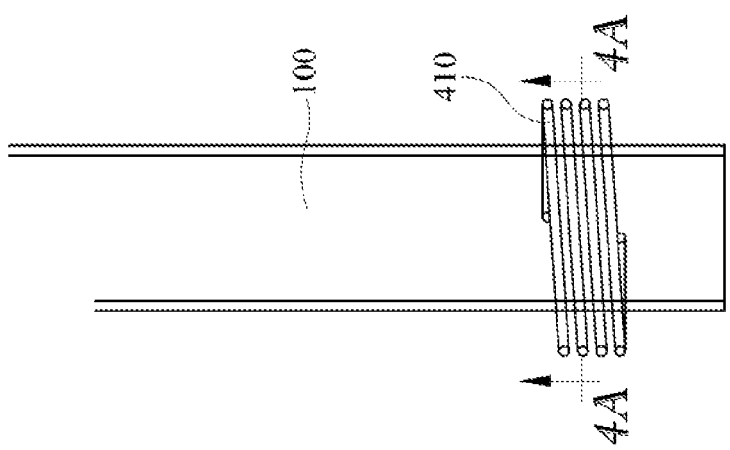
FIG. 4 and FIG. 4A are, respectively, top and cross section (along line 4A-4A) views of an embodiment of an arrangement of an exemplary induction heating coil acting upon the work piece during the in-line process for producing a structural member.
Figure 4A:
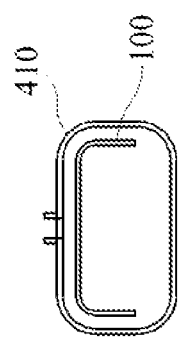
Figure 6B:
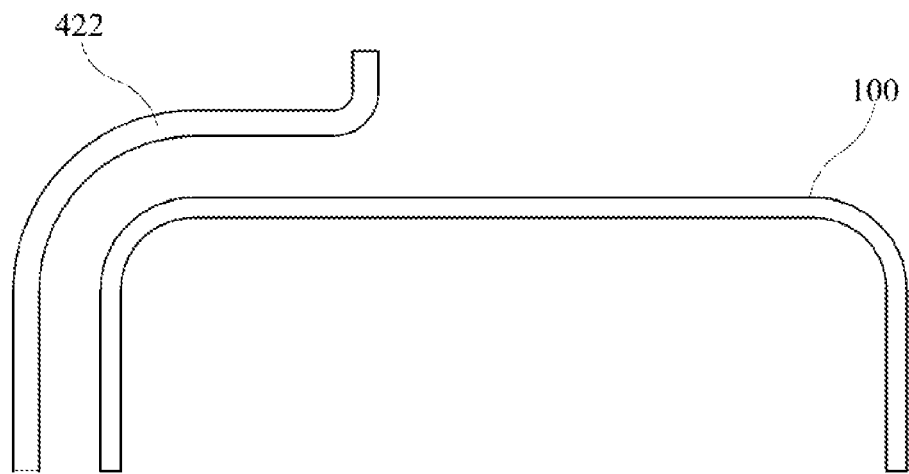
FIGS. 6B and 6C are end views of yet other arrangements of exemplary induction heating coils acting upon zones of the work piece.
Figure 6C:
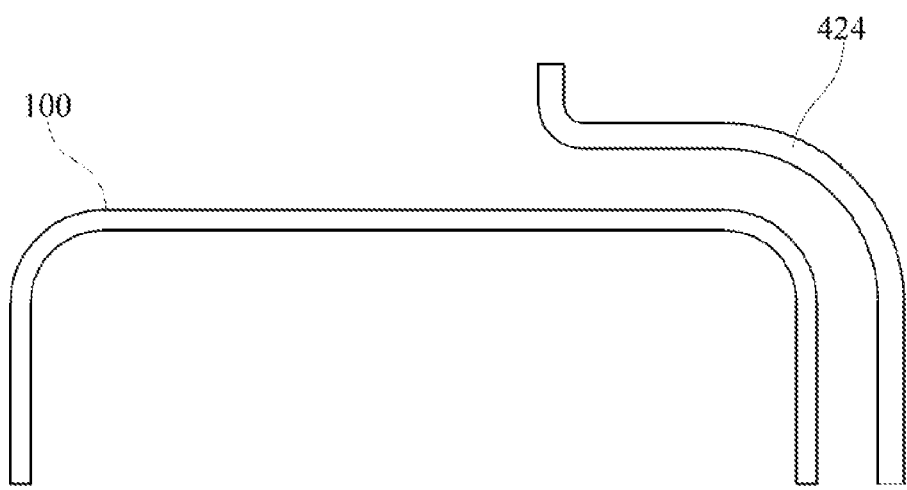

Referring now to FIGS. 4 and 4A, an embodiment of an exemplary induction heating coil 410 is illustrated. FIGS. 5 and 5A show alternative embodiments of an induction heating coil 420 that may be used instead of or in addition to the induction heating coil 410 of FIGS. 4 and 4A. As illustrated in FIG. 4A, coil 410 may be substantially rectangular to allow continuous work piece 100 to pass therethrough while being heated by coil 410. It may also be appreciated that coil 410 is shaped in a way that may allow various shapes of continuous work piece 100 to pass therethrough, such as, for example, a box shaped channel, an I-shaped or Z-shaped channel, and/or or any of a variety of other shapes or profiles of continuous work piece 100. Thus, coil 410 may be shaped to heat and allow passage of a variety of shapes of continuous work piece 100. As illustrated in FIG. 5A, coil 420 may more closely track or resemble the shape or profile of continuous work piece 100. In doing so, coil 420 may be located more closely to substantially all surfaces of continuous work piece 100 and thereby heat continuous work piece 100 quickly and/or more efficiently. However, it may be appreciated that coil 420 is shaped in a way that may not easily allow heating and/or passage of various other shapes of continuous work piece 100, such as, for example, if continuous work piece 100 is box shaped or Z-shaped. Either or both of coils 410 may uniformly or symmetrically heat continuous work piece 100, for example, by being substantially symmetrically disposed about continuous work piece 100. Moreover, any number of coils 410, or of coils 420, or of both, may be used any virtually any combination.

FIGS. 6 and 6A-6C show embodiments of trim induction heating trim coils 430, 432, 434, and 436 that may be used instead of or in addition to the induction heating coils of FIGS. 4 and 4A or FIGS. 5 and 5A. Trim heating coils 430, 432, 434, and/or 436 may be used, for example, to precisely heat continuous work piece 100 or zones thereof to achieve desired temperatures or properties (e.g., hardness, strength, metallurgical profile) of continuous work piece 100. Certain sections, portions, or zones of continuous work piece 100 may be targeted by trim coils 432 and 434. For example, a first side trim coil 432 may target one side or flange of continuous work piece 100 and/or a second side trim coil 434 may target another or opposite side or flange of continuous work piece 100. In this way, a first zone or flange of continuous work piece 100 may be heated differently and/or be formed with a different hardness or other property than a second zone or flange of continuous work piece 100. For example, the shapes of, positions of, distances from continuous work piece 100, powers to, and/or frequencies of powers to, first side trim coil 432 and second side trim coil 434 may be varied to result in different heating of respective zones of continuous work piece 100. It is understood that the zones referred to herein may include joints, corners, any portion thereof, or any combination thereof, instead of, or in addition to web zones and/or flange zones.

Figure 9:
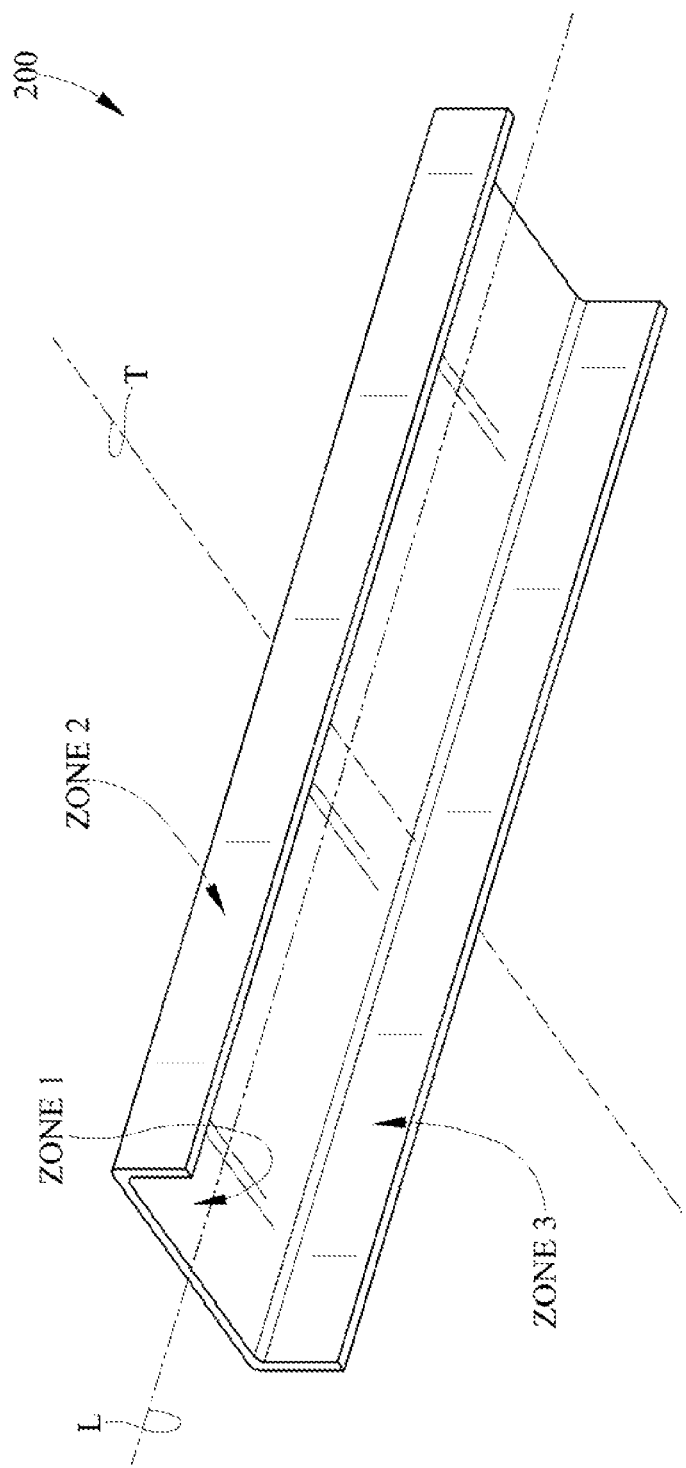
FIG. 9 is a perspective view of an exemplary embodiment of a piece of material formed into a structural member having the finished process profile of FIG. 3C and a plurality of zones of physical properties of the structural member.

Any or all trim coils 430, 432, 434, and 436 may be used, for example, at second rapid heating or tempering station F. The various shapes, sizes, and locations relative to continuous work piece 100 of the induction heating coils may be used to target areas or zones of continuous work piece 100. In this way, the induction heating coils may be used to rapidly heat and/or temper continuous work piece 100 substantially symmetrically or uniformly, or alternatively, may be used to rapidly heat and/or temper continuous work piece 100 substantially asymmetrically or non-uniformly. For example, coils 432 and 434 may target different sides of continuous work piece 100 to heat or temper different areas at different rates and/or to different temperatures, which may result in lateral zones of continuous work piece 100 having different hardness, different strength, other different physical properties, or any combination thereof. Moreover, as described above, power may be varied to the respective heating coils to allow targeted heating rates and/or target heating temperatures. Thus, a continuous work piece 100 may have a plurality of zones, any or all of which may have properties that are unique and/or different from any other zone (such as is illustrated in FIG. 9). In some embodiments, coil 410 may be used in conjunction with any or all trim coils 430, 432, 434, and/or 436; coil 420 may be used in conjunction with any or all trim coils 430, 432, 434, and/or 436; and/or coils 410 and 420 may be used in conjunction with trim coils 430, 432, 434, and/or 436.

Figure 6:
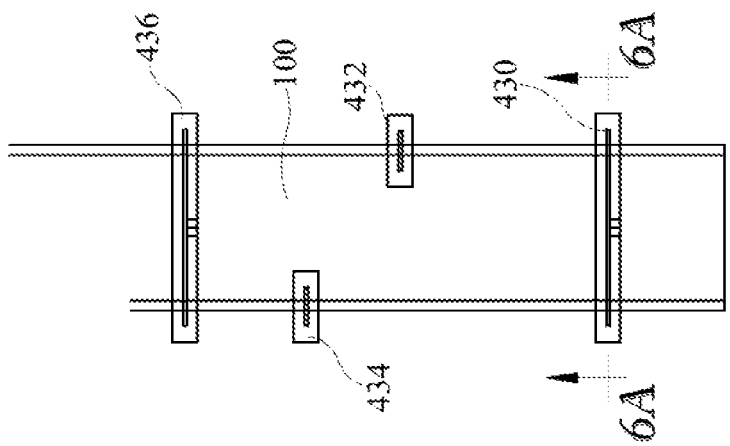
FIG. 6 and FIG. 6A are, respectively, top and cross section (along line 6A-6A) views of yet another arrangement of exemplary induction heating coils acting upon the work piece during the in-line process for producing a structural member.
Figure 6A:
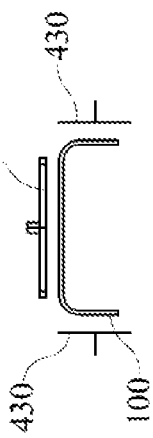

Induction heating may be varied, controlled, and/or targeted by varying the shape of, power to, frequency of power to, any or all coils, such as coils 410, 420, 430, 432, 434, and/or 436, such as described above. Any or all heating coils, such as heating coils 410, 420, 430 may have various profile shapes (as shown in FIGS. 4A, 5A, and 6A). The design of heating coils 410, 420, 430 may affect the heating rate and/or heating efficiency. It has been found that the heating rate and efficiency may be optimized and/or maximized by locating heating coils 410, 420, 430 closely to continuous work piece 100. Keeping the inner diameter or perimeters of heating coils 410, 420, 430 and the outer perimeter of continuous work piece 100 to a practical minimum may generally increase or improve heating rate and/or heating efficiency. However, since heating coils 410, 420, 430 may be expensive, some compromise may be made so that relatively few coils may be used to cover a relatively large range of sizes, shapes, and/or configurations of continuous work piece 100. Typical clearances between continuous work piece 100 and coils 410, 420, 430 may be in the range of about 3 mm to about 25 mm. Moreover, higher temperatures generally require less heating time and lower temperatures generally require more heating time. Thus, longer coils and/or more coils typically will provide more heating time, which may allow use of lower temperatures (and thus lower power requirements per coil). Similar induction heating coils may be used in first rapid heating station D, and the aforementioned parameters and considerations may apply to such heating coils. Thus, heating may be targeted and/or varied in first rapid heating station D, and the heating that occurs in first rapid heating station D may be substantially symmetrical or asymmetrical.

Any or all trim coils 430, 432, 434, and 436 may take any of a variety of shapes, forms and/or sizes. For example, they may be flat, and exert the magnetic field over one surface or surfaces of continuous work piece 100, and/or any or all coils may be contoured to wrap around the surface of continuous work piece 100. It has been found that it is not always necessary to have any trim coil surrounding or facing both inside and outside surfaces of continuous work piece 100 as the heat may penetrate through relatively thin depths of continuous work piece 100. It is understood that having any or all trim coils 430, 432, 434, or 436 (or other shape, size, or form) surround or face both inside and outside surfaces (or any other surfaces) of continuous work piece 100 may facilitate heating continuous work piece 100 quickly and/or efficiently, although it is not always required and/or for some shapes of continuous work piece 100 may be of little or no additional benefit concerning time or efficiency.

Various shapes or forms that may be used for any or all trim coils 430, 432, 434, or 436 (or any other coil described herein or any other coil that may be used) may include, without limitation, hairpin coils and/or pancake coils, as one of ordinary skill in the art will readily appreciate and understand. A pancake coil may a plurality of distinct coils (e.g., three distinct coils as illustrated in FIG. 6A), any of which may be varied to produce a plurality of distinct heating or tempering zones. Any or all of the distinct pancake coils may be turned on and off (or ramped up and down in power, frequency, etc.) at appropriate times as continuous work piece 100 passes under the coil(s), for example, to vary the properties (e.g., hardness, strength(s), etc.) along the length and/or width of continuous work piece 100. Thus, in some embodiments, making a straight, uniform part may require the same equipment and capability as making a curved, non-uniform part.

I have also included a drawing from page 214 from the same reference book. This shows the direction of the magnetic flux created by the "solenoid" coil and the pancake (or hairpin) coil. The selection of the shape coil, the frequency and the power of the coil, etc., all work together to influence the outcome of the process. There are various combinations of these factors which can produce quite similar results, and each combination may have their unique associated positive and negative factors.

Figure 7A:
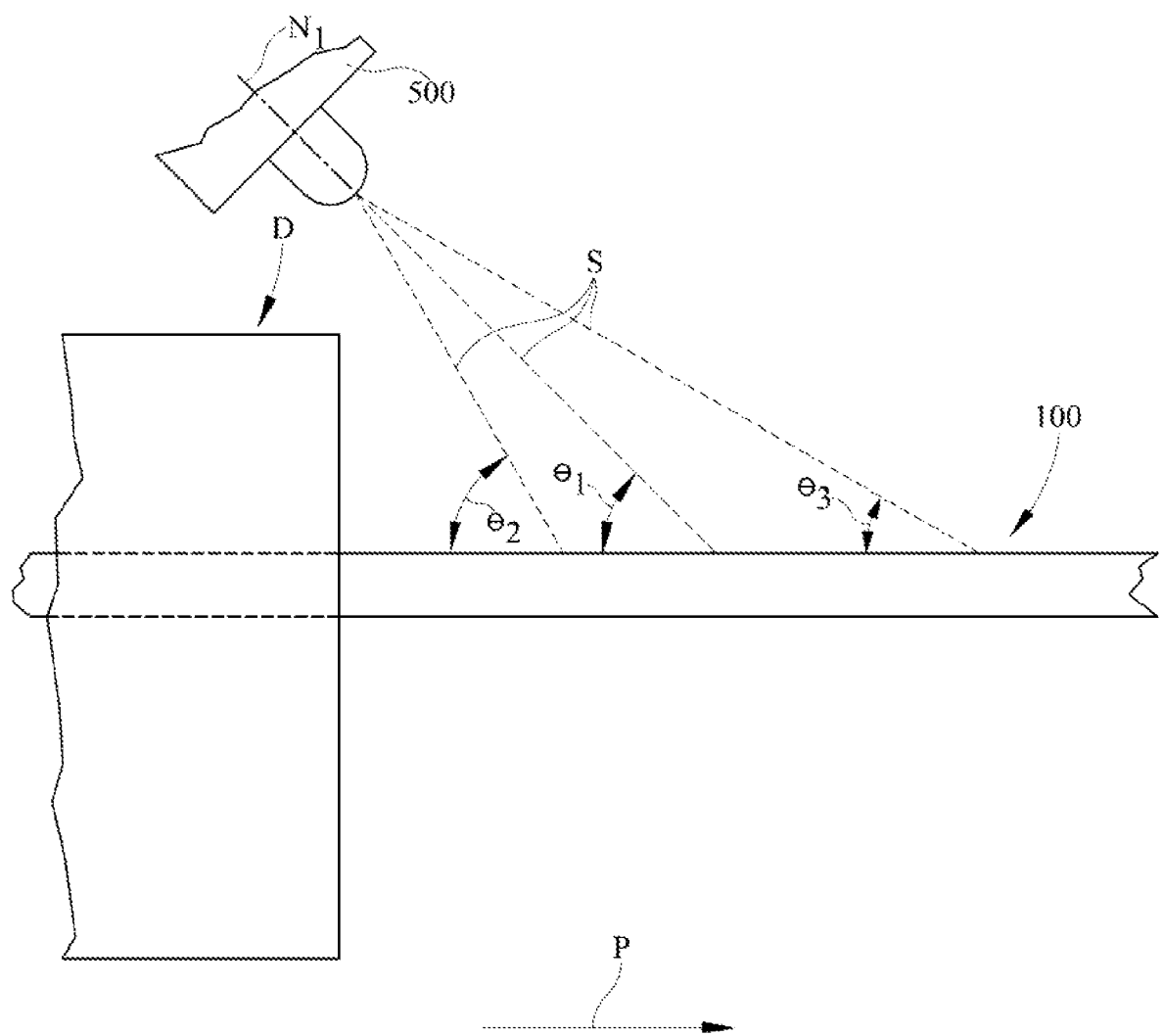
FIG. 7A is a side of an exemplary embodiment of an induction heating device and cooling/quenching nozzle acting on the continuous work piece, with the nozzle disposed to deliver its cooling spray at an angle away from the induction heating device.
Figure 7B:
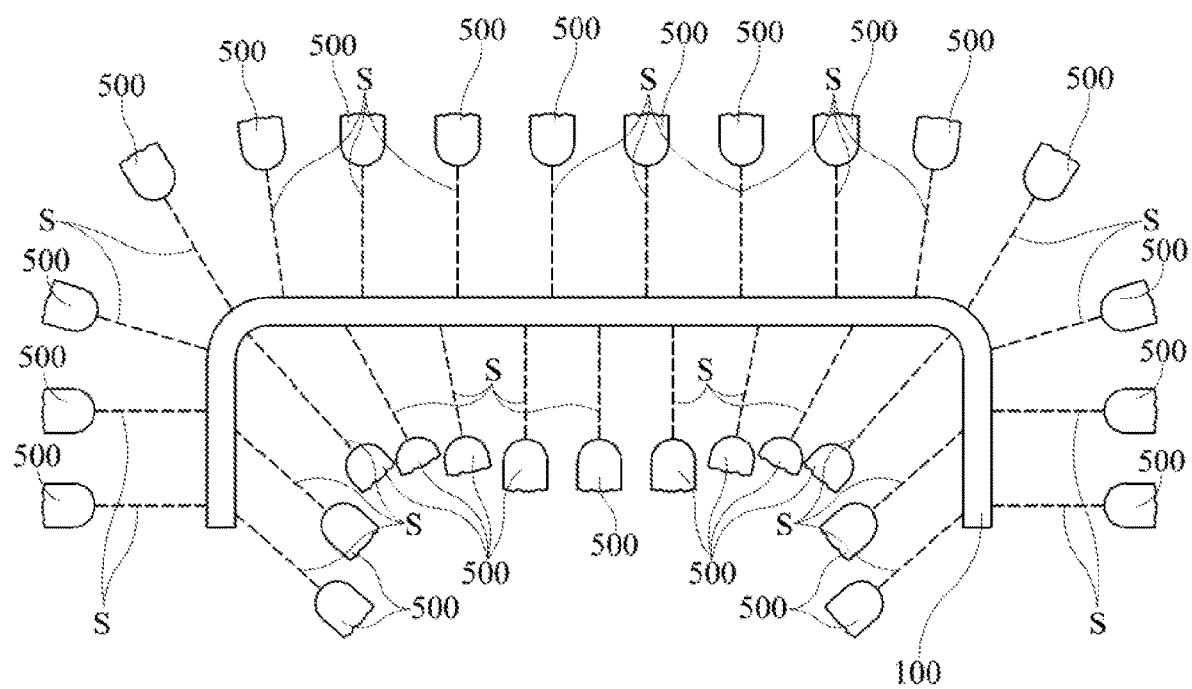
FIG. 7B is a front view of an exemplary embodiment of a continuous work piece being symmetrically cooled by a plurality of spray jets acting on the surface of the continuous work piece.

Referring now to FIGS. 7A and 7B, a plurality of sprays S from nozzle(s) 500 may be directed toward or onto continuous work piece 100, such as from, for example, nozzle $N_1$ at a variety of spray angles $\theta_1, \theta_2, \theta_3$. Continuous work piece 100 may move relative to first rapid heating station D and/or spray(s) S in process direction P. It is understood that more than one nozzle may be used instead of or in addition to nozzle $N_1$, but only one nozzle is shown in FIG. 7A for the purpose of clarity and description. Nozzle $N_1$ may be oriented at impingement angle or spray angle $\theta_1$, which is shown as about 45 degrees but may be between 0 and 90 degrees, to, for example, prevent or inhibit spray S from entering or damaging first rapid heating station D or second rapid heating station F. Spray angle $\theta_2$ is shown at about 60 degrees, but may be between 0 and 90 degrees, and spray angle $\theta_3$ is shown at about 30 degrees, but may be between 0 and 90 degrees. In some embodiments, sprays S may substantially surround and/or come into contact with continuous work piece 100 substantially uniformly at points or areas around continuous work piece 100. Such uniformity of sprays S, and/or uniformity of spray rates and cooling media of sprays S, may facilitate substantially symmetrical cooling of continuous work piece 100, which may help minimize or prevent distortions, for example, due to gradient cooling rates and/or differing thermal stresses or if the spray nozzles 500 are not all equidistant from the surface(s) of continuous work piece 100. It is understood however, that sprays S may be varied to, for example, achieve asymmetrical cooling as discussed above.

Figure 8:
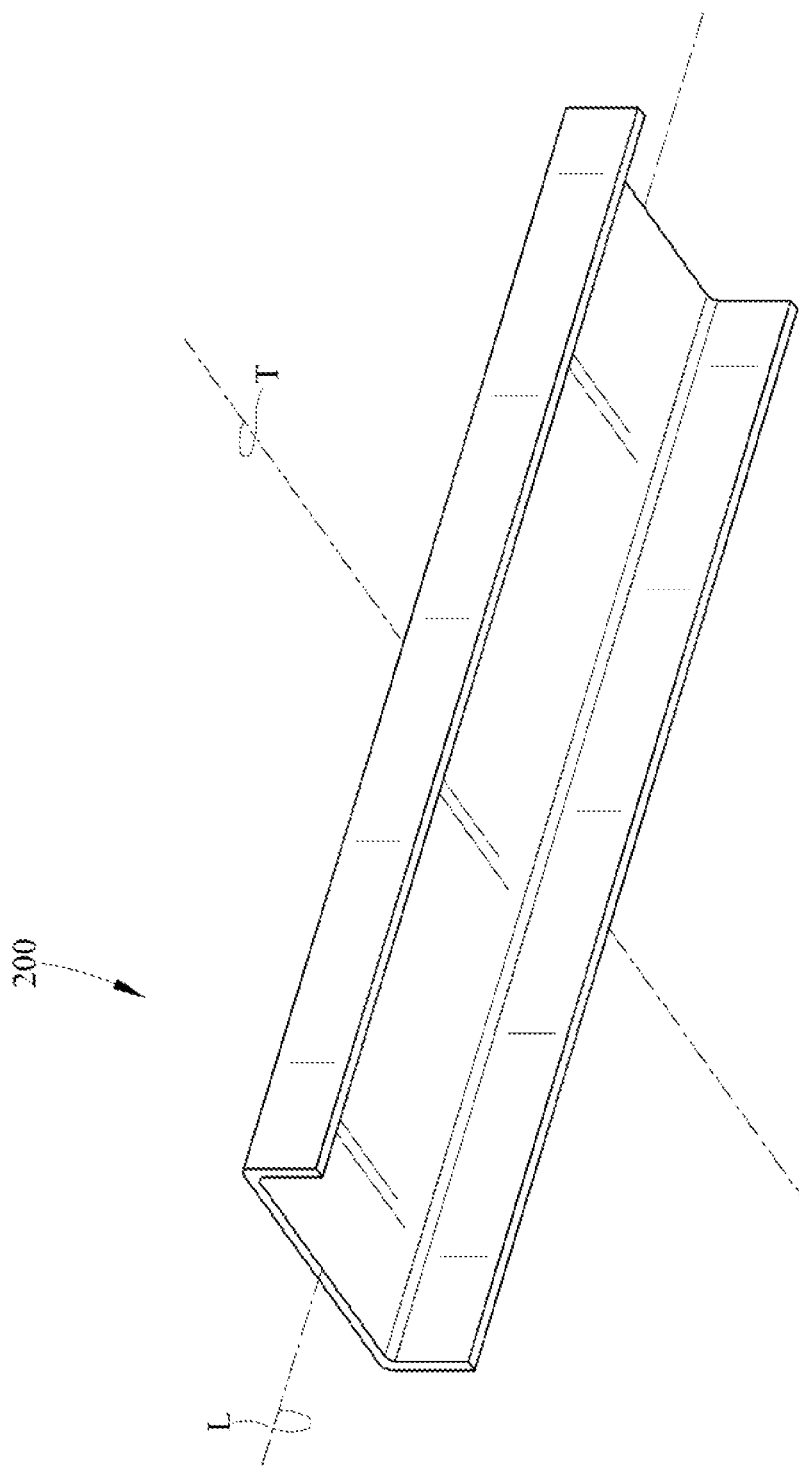
FIG. 8 is a perspective view of an exemplary embodiment of a piece of material now in the form of a structural member having the finished process profile of FIG. 3C and a uniform hardness profile.

Referring now to FIGS. 8 and 9, structural member 200 may have a lengthwise or axial dimension L and/or a crosswise or transverse dimension T. In some embodiments, structural member may have substantially uniform properties (e.g., from uniform heating, cooling, and/or tempering) in axial dimension A and/or in transverse dimension T. In alternative embodiments, targeted heating and/or cooling may provide structural member 200 with various properties in the axial dimension L and/or in the transverse dimension T. For example, exemplary Zone 1, Zone 2, and/or Zone 3 may have varying metallurgical profiles, thermodynamic properties, and/or physical properties such as hardness or strength. Thus, for example, if first rapid heating D, first rapid cooling E, and/or second rapid cooling G are substantially symmetrical, and second rapid heating or tempering F is asymmetrical (e.g., as discussed above and/or asymmetrical by varying power to heating coils or targeting sides or areas of continuous work piece 100), then Zones 1-3 may represent various temper zones, wherein the properties of continuous work piece 100 and/or frame rail or structural member 200 are substantially varied by asymmetrical tempering at second rapid heating station F. It is understood that second rapid heating F may be substantially symmetrical instead, and/or that first rapid heating D, first rapid cooling E, and/or second rapid cooling G may be substantially asymmetrical. Asymmetric tempering resulting in varying temper zones in merely one example of how the properties of continuous work piece 100 and/or structural member 200 may be varied between zones.

It is understood that, although FIG. 9 shows three zones, wherein Zone 1 is the web (or a portion thereof) of continuous work piece 100, and Zones 2 and 3 are respective flanges (or portions thereof) of continuous work piece, three zones is merely an exemplary number of zones that may be included, and one or more zones may be included instead of or in addition to exemplary Zones 1-3. For example, temper zones and/or zones of specified properties (whether symmetric or asymmetric) may be located at or near joints and/or corners where web and flange(s) meet (if continuous work piece 100 includes web and flange(s)). For another example, any of Zones 1-3 (or any other zone) may be further divided into more zones, such as, for example, is illustrated in FIG. 11. The Zones 1-3 of FIG. 9 are merely exemplary and provided for illustrative purposes.

In some embodiments, Zone 1 may represent a central portion or web of continuous work piece 100, and/or Zones 1 and 2 may represent opposite sides or flanges of continuous work piece 100. As discussed in more detail below, the properties of continuous work piece 100 may vary from zone to zone, or may be substantially uniform from zone to zone. For example, Zone 1 may be harder than Zones 2 and 3, which may be of similar hardness, resulting in the "hard web" design illustrated in FIG. 11. For another example, Zone 1 may be less hard than Zones 2 and 3, which may be of similar hardness, resulting in the "soft web" design illustrated in FIG. 11. For yet another example, Zones 1-3 may be of similar hardness resulting in the "uniform" design illustrated in FIG. 11. It is understood that other examples are possible, and that these examples are provided merely for the purpose of illustration. It is further understood that, in some embodiments, continuous work piece 100 and/or structural member 200 may be formed such that Zones 1 and 2 are of dissimilar or non-uniform hardness.

It is understood that, any point prior to being formed into structural member 200 and/or cut such as at exemplary cutting station I, the material may have sufficient length in the axial dimension A to be simultaneously located in one or more stations. For example, a substantially solid piece of material may simultaneously be in all stations prior to or including cutting station I (wherever it may be located), such as, for example, being in each of supply station A, feeder station B, forming station C, first heating station D, first rapid cooling station E, second heating station F, second rapid cooling station G, calibration station H, and/or cutting station I. Thus, it is possible that a single piece of material may simultaneously be in more than one processing station and/or subject to more than one processing step, although it is not required to be. Instead, it is also possible that a given piece of material is in only one processing station and/or subject to only one processing step, if so desired.

Figure 10:
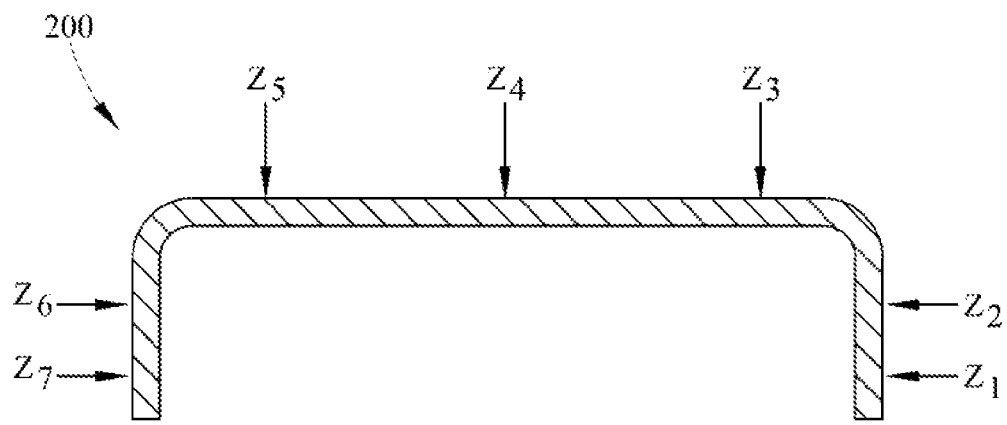
FIG. 10 is a front view of an embodiment of a finished work piece having physical properties that may vary across exemplary zones.
Figure 10A:
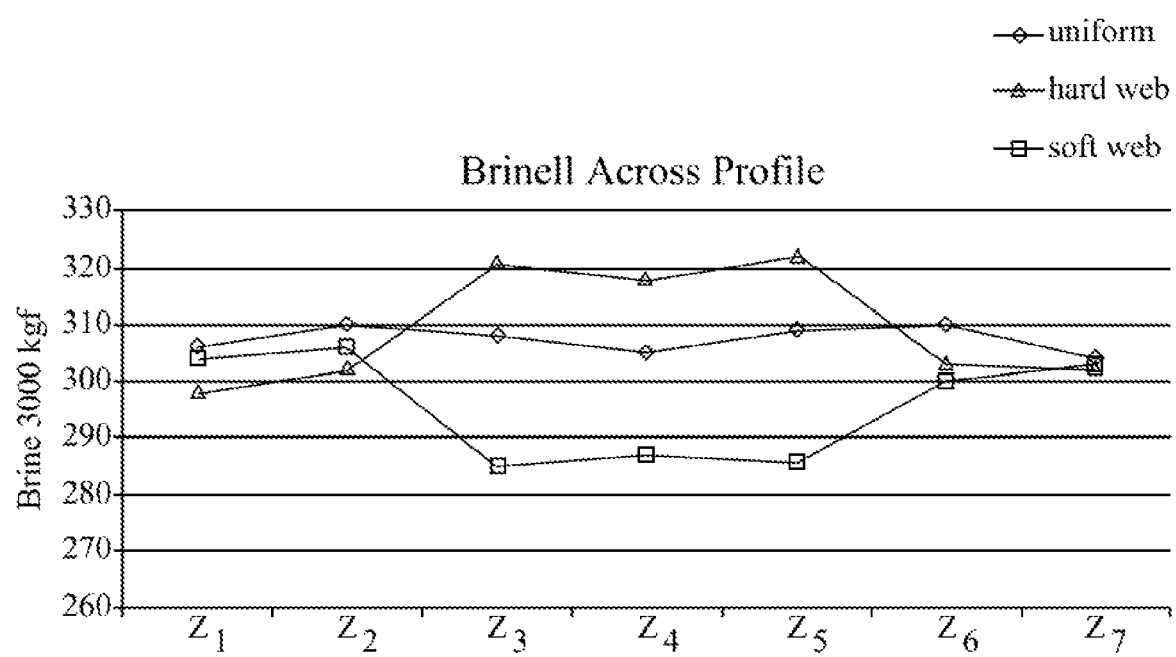
FIG. 10A is a line graph showing exemplary physical properties of the exemplary zones of FIG. 10.

With reference now to FIGS. 10 and 10A, an exemplary embodiment of structural member 200 is depicted having a plurality of lateral or transverse zones $Z_1$-$Z_7$, with the Brinell hardness variable across the zones for various exemplary materials depicted by the different lines in the chart of FIG. 10A. It is understood that structural member 200 may have seven zones as depicted in FIGS. 10 and 10A, may have less than seven zones (e.g., as depicted in FIG. 9), or may have more than seven zones. Seven zones $Z_1$-$Z_7$ are merely exemplary and provided for illustration. The differing hardness between transverse zones $Z_1$-$Z_7$ may, for example, be desired for a certain frame rail or structural member 200, which may be designed for a certain use within, for example, a motor vehicle. The differing hardness between transverse zones $Z_1$-$Z_7$ may, for example, be caused by targeted heating in rapid heating or tempering station F to achieve differing physical properties between the zones $Z_1$-$Z_7$ (which properties may also be varied longitudinally as discussed above and shown in FIG. 9, but not shown in FIGS. 10 and 11).

Examples of structural members 200, for example frame rails, having various properties resulting from system 10 and/or the process described above are described below:

Example 1

A continuous work piece was austenitized using a single induction coil that closely tracked the profile of the work piece (see, e.g., FIG. 5A) at 78% power of a 25 Khz 150 KW power source. The work piece was heated in the first rapid heating station to a temperature of about 950 degrees C. The work piece was travelling at 0.73 meters/minute, and quenched within about 5-10 seconds to below 100 C to create a full martensitic microstructure. The work piece was then tempered with the same type induction coil operating at 21.25% power, achieving about 510 degrees C. and travelling at 0.73 meters/minute. The work piece was then ambient air cooled over a 2 hour period. The resulting hardness of the material was a Brinell Hv3000 kg of 348. The resulting work piece had a tensile strength (T) of 146.51 MPa.

Example 2

In a second example, a work piece was austenitized and tempered using the same process as in Example 1, except that instead of being air cooled after tempering, it was rapidly water-cooled to below 30 degrees C. The resulting hardness of the material was a Brinell Hv3000 kg of 369. The resulting work piece had a tensile strength (T) of 146.51 MPa.

Example 3

In a third example, a work piece was austenitized as in Examples 1 and 2, but tempered using a single induction coil having an oval shape (see, e.g., FIG. 4A) at 14% power of a 1 Khz, 250 KW induction power supply. The work piece tempering temperature was about 537 degrees C. The resulting work piece hardness was Brinell 302 near the center (see, e.g., zone $Z_4$ of FIG. 10), and Brinell 287 at the flange (see, e.g., zone $Z_2$ of FIG. 10). The resulting work piece had a tensile strength (T) of 96.53 MPa.

Example 4

In a fourth example, a work piece was austenitized as in the above examples, but tempered using a 35 KW line induction coil having an oval shape (see, e.g., FIG. 4A) at 12.8% power. The resulting tempering temperature was 582 degrees C. The resulting work piece hardness was Brinell 286 near the center (see, e.g., zone $Z_4$ of FIG. 10), and Brinell 302 at the flange (see, e.g., zone $Z_2$ of FIG. 10). The resulting work piece had a tensile strength (T) of 88.25 MPa.

Examples 3 and 4 illustrate the result of using a single coil to asymmetrically heat the work piece resulting in a zone(s) of intentionally reduced hardness.

It is understood that the above examples are provided only for the purpose of illustrating exemplary outcomes of the process, system, and apparatus described above, and these examples in no way limit the scope or breadth of the claims or the description contained herein.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases.

The foregoing description of several methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

What is claimed is:

1. A method for producing a hardened and tempered structural member comprising the steps of:
   providing a coiled ferrous continuous work piece of selected composition;
   roll forming said coiled ferrous continuous work piece into a desired profile;
   rapidly heating said ferrous continuous work piece in an induction heating device within a range of about 850° C. to 1000° C. within about 300 seconds to produce austenite substantially throughout the profile of said continuous work piece;
   rapidly cooling said austenitized continuous work piece with a cooling medium to below about 350° C. within 10 seconds or less to convert said austenite to martensite substantially throughout said continuous work piece, resulting in a hardened work piece;
   tempering said continuous workpiece by rapidly heating said hardened work piece in a second induction heating device to about 450° 600° C. within 40 seconds or less, providing a hardened and tempered work piece of a desired hardness;
   wherein at least one of said heating, said cooling, or said tempering is asymmetrical at selected zones of said work piece;
   cooling said hardened and tempered continuous work piece to a desired cutting temperature; and, cutting said hardened and tempered continuous work piece to a desired length.

2. The method of claim 1 further comprising the step of powder coating said hardened and tempered work piece.

3. The method of claim 1 wherein said selected composition of said continuous work piece is SAE 15B27 steel.

4. The method of claim 1 wherein said continuous work piece is subjected to at least one of substantially symmetric heating and symmetric cooling, wherein distortions resulting from different heating or cooling rates is substantially minimized.

5. The method of claim 1 wherein said asymmetrical tempering at one or more zones of said work piece results in said hardened and tempered continuous work piece of said desired profile having at least a first zone having a first hardness and a second zone having a second hardness different from said first hardness.

6. The method of claim 5 wherein said first zone includes a web.

7. The method of claim 5 wherein said second zone includes at least one flange.

8. The method of claim 1 wherein each step occurs substantially continuous and in-line in a straight line.

9. The method of claim 1 wherein distortions are measured by an optical measuring device.

10. The method of claim 9 wherein said optical measuring device includes a laser.

11. The method of claim 9 wherein said optical measuring device continuously provides measurement information to a computer, and said computer determines if there is distortion above an acceptable amount, wherein said computer activates a calibration device if distortion is above said acceptable amount.

12. The method of claim 11 wherein said method further comprises the step of further roll forming said hardened and tempered continuous work piece resulting from activation of said calibration device, and wherein said acceptable amount is less than about 1 mm/m.

* * * * *